United States Patent
Ni et al.

(10) Patent No.: US 9,220,117 B2
(45) Date of Patent: Dec. 22, 2015

(54) IMS CROSS CARRIER SUPPORTABILITY

(71) Applicant: Verizon Patent and Licensing Inc., Basking Ridge, NJ (US)

(72) Inventors: James J. Ni, Westford, MA (US); Elliot G. Eichen, Arlington, MA (US); Rezwanul Azim, Arlington, MA (US); Rafael A. Gaviria, Medford, MA (US); Gowtham Javaregowda, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 82 days.

(21) Appl. No.: 13/917,102

(22) Filed: Jun. 13, 2013

(65) Prior Publication Data
US 2014/0369267 A1    Dec. 18, 2014

(51) Int. Cl.
*H04W 4/00* (2009.01)
*H04L 12/28* (2006.01)
*H04W 76/02* (2009.01)
*H04W 8/04* (2009.01)
*H04W 8/12* (2009.01)

(52) U.S. Cl.
CPC ............... *H04W 76/02* (2013.01); *H04W 8/04* (2013.01); *H04W 8/12* (2013.01)

(58) Field of Classification Search
USPC .................................. 370/329, 401
See application file for complete search history.

(56) References Cited

U.S. PATENT DOCUMENTS

| | | | |
|---|---|---|---|
| 7,979,066 B2 * | 7/2011 | Pan ............................ | 455/432.1 |
| 2008/0261593 A1 * | 10/2008 | Wong et al. ................ | 455/435.1 |
| 2008/0267199 A1 * | 10/2008 | Smith et al. ................... | 370/401 |
| 2010/0189017 A1 * | 7/2010 | Mas Rosique et al. ....... | 370/259 |
| 2014/0177481 A1 * | 6/2014 | Gaviria et al. ............... | 370/259 |

* cited by examiner

*Primary Examiner* — Omar Ghowrwal
*Assistant Examiner* — Angel Brockman

(57) ABSTRACT

A system may include a first Internet Protocol Multimedia Subsystem (IMS) network comprising one or more devices configured to receive a first registration request for a first mobile directory number (MDN), associated with a subscriber, wherein the first MDN corresponds to a home mobile directory number with respect to the first IMS network; and register the first MDN with the first IMS network. The one or more device may be further configured to detect a service point trigger, associated with the subscriber, to register a second MDN, foreign to the first IMS network, with a second IMS network, in response to the first MDN being registered; and send a second registration request to the second IMS network, to register the second MDN with the second IMS network.

23 Claims, 17 Drawing Sheets

9,220,117 B2

IMS CROSS CARRIER SUPPORTABILITY

BACKGROUND INFORMATION

The Internet Protocol (IP) Multimedia Subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between the two most successful communication paradigms—cellular and Internet technology, by providing Internet services everywhere using cellular technology in a more efficient way. Session Initiation Protocol (SIP) is the main protocol for IMS. SIP is an application layer control (signaling) protocol for creating, modifying and terminating sessions with one or more participants.

DETAILED DESCRIPTION OF PREFERRED EMBODIMENTS

Figure 1:
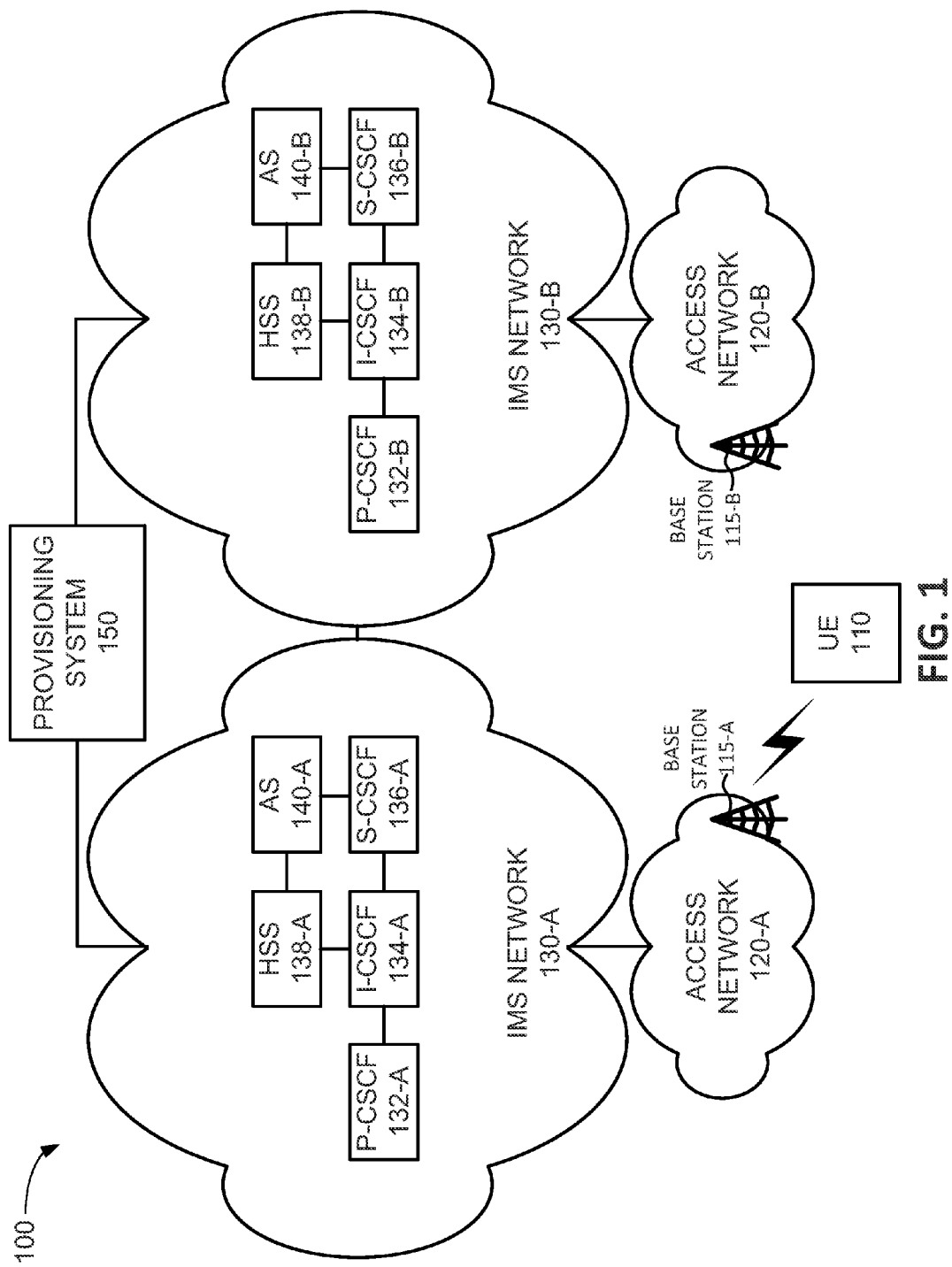
FIG. 1 is a diagram illustrating an exemplary environment according to an implementation described herein.

The following detailed description refers to the accompanying drawings. The same reference numbers in different drawings identify the same or similar elements.

A subscriber of telephone services may have multiple telephone numbers, such as, for example, a personal telephone number and a work telephone number. The subscriber may associate the multiple telephone numbers with a particular user equipment device (UE), such as mobile communication device. The multiple telephone numbers may be linked to the UE in an implicit registration set (IRS) in a subscriber database. The subscriber database may maintain a location of the UE and a call to any of the multiple telephone numbers, referred to herein as mobile directory numbers (MDNs), may be routed to the subscriber's UE. In order for an Internet Protocol (IP) Multimedia Subsystem (IMS) network to be able to locate a UE and to route a call to the UE, the UE may need to register with the IMS network.

Different MDNs may be associated with different IMS networks. Thus, a subscriber's UE may be assigned a first MDN by a first IMS network and a second MDN by a second IMS network. The first MDN may be referred to as a home MDN with respect to the first IMS network and a foreign MDN with respect to the second IMS network. The second MDN may be referred to as a foreign MDN with respect to the first IMS network and as a home MDN with respect to the second IMS network.

Implementations described herein relate to IMS cross carrier supportability. A UE may be associated with a subscriber profile in a Home Subscriber Server (HSS) that includes a service profile with a service point trigger to register a first MDN and a second MDN. Thus, when the UE registers the first MDN with a first IMS network, the service point trigger may cause the first IMS network to register the second MDN with a second IMS network.

A first IMS network may be configured to receive a first registration request for a first MDN, associated with a subscriber, the first MDN being a home MDN with respect to the first IMS network and to register the first MDN with the first IMS network. The first IMS network may then, based on information stored in the HSS, detect a service point trigger, associated with the subscriber, to register a second MDN, foreign to the first IMS network, with a second IMS network, in response to the first mobile directory number being registered; and may register the second MDN with the second IMS network.

In an implementation, a first MDN and a second MDN may both be available in a UE, a first IMS network may be home to the first MDN and a second IMS network may be home to the second MDN, the UE may register with the first IMS network using the first MDN, and registration with the second IMS network may be performed by an application server (AS) of the first IMS network and a Serving Call Session Control Function (S-CSCF) device of the second IMS network using the second MDN.

In another implementation, a first MDN and a second MDN may both be available in a UE, a first IMS network may be home to the first MDN and a second IMS network may be home to the second MDN, the UE may register with the first IMS network using the first MDN, and registration with the second IMS network may be performed by an AS of the first IMS network and a Proxy Call Session Control Function (P-CSCF) device of the second IMS network using the second MDN.

In yet another implementation, a first MDN and a second MDN may both be available in a UE, a first IMS network may be home to the first MDN and a second IMS network may be home to the second MDN, the UE may register with the first IMS network using the first MDN, and registration with the second IMS network may be performed by an AS of the first IMS network and an S-CSCF device of the second IMS network using the first MDN.

In yet another implementation, a first MDN and a second MDN may both be available in a UE, a first IMS network may be home to the first MDN and a second IMS network may be home to the second MDN, the UE may register with the first IMS network using the first MDN, and registration with the second IMS network may be performed by an AS of the first IMS network and a P-CSCF device of the second IMS network using the first MDN.

In yet another implementation, only the first MDN may be available in a UE, a first IMS network may be home to the first MDN and a second IMS network may be home to the second MDN, registration may be started in the second IMS network using the available and foreign first MDN, registration in the first IMS network may be performed using the first MDN, and registration with the second IMS network may be performed by an AS of the first IMS network and an S-CSCF device of the second IMS network using the second MDN.

In yet another implementation, only the first MDN may be available in a UE, a first IMS network may be home to the first MDN and a second IMS network may be home to the second MDN, registration may be started in the second IMS network using the available and foreign first MDN, registration in the first IMS network may be performed using the first MDN, and registration with the second IMS network may be performed by an AS of the first IMS network and a P-CSCF device of the second IMS network using the second MDN.

In yet another implementation, only the first MDN may be available in a UE, a first IMS network may be home to the first MDN and a second IMS network may be home to the second MDN, registration may be started in the second IMS network using the available and foreign first MDN, registration in the first IMS network may be performed using the first MDN, and registration with the second IMS network may be performed by an AS of the first IMS network and an S-CSCF device of the second IMS network using the first MDN.

In yet another implementation, only the first MDN may be available in a UE, a first IMS network may be home to the first MDN and a second IMS network may be home to the second MDN, registration may be started in the second IMS network using the available and foreign first MDN, registration in the first IMS network may be performed using the first MDN, and registration with the second IMS network may be performed by an AS of the first IMS network and a P-CSCF device of the second IMS network using the first MDN.

An MDN, as the term is used herein, may refer to an IMS public identity (IMPU) of a UE, may refer to a telephone number, or may refer to another type of identifier, assigned to a UE. As an example, and MDN may correspond to a mobile directory number assigned to the UE by a particular IMS network and may correspond to a Mobile Subscriber Integrated Services Digital Network number (MSISDN), a SIP Uniform Resource Identifier (URI) number, a mobile identification number (MIN), and/or another type of telephone number.

FIG. 1 is a diagram of an exemplary environment 100 in which the systems and/or methods described herein may be implemented. As shown in FIG. 1, environment 100 may include a user equipment device (UE) 110, a first access network 120-A and a second access network 120-B (referred to herein collectively as "access networks 120" and individually as "access network 120"), a first IMS network 130-A and a second IMS network 130-B (referred to herein collectively as "IMS networks 130" and individually as "IMS network 130"), and a provisioning system 150.

UE 110 may include any device configured for placing and/or receiving telephone calls via an IMS network. For example, UE 110 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a set-top box; a gaming system; and/or any type of device with communication capability.

Access network 120 may include a wireless access network that enables UE 110 to communicate with IMS network 130 using one or more base stations 115. For example, access network 120 may include a wireless access network based on the Long Term Evolution (LTE) standard specified by the $3^{rd}$ Generation Partnership Project (3GPP); a code division multiple access (CDMA) wireless access network, such as a CDMA one times radio transmission technology (1XRTT) network, a CDMA High Rate Packet Data (HRPD) network (which may include a CDMA evolution optimized data only (EV-DO) network), or a CDMA enhanced HRPD (eHRPD) network; an access network based on a Global System for Mobile Communication (GSM) standard, such as a General Packet Radio Service (GPRS) network, an Enhanced Data Rates for GSM Evolution (EDGE) network, a Universal Mobile Telecommunications System (UMTS) network (also known as a wideband CDMA (W-CDMA) network), or a High Speed Packet Access (HSPA) network; an access network based on an IEEE standard, such as a Worldwide Interoperability for Microwave Access (WiMAX), WiFi, etc.; an access network based on a wire-line standard, such as Integrated Services Digital Network (ISDN), Dial-up, Digital Subscriber Line (DSL), PacketCable, Fiber, etc.; and/or another type of access network. First access network 120-A may be used by UE 110 to access first IMS network 130-A via base station 115-A and second access network 120-B may be used by UE 110 to access second IMS network 130-B via base station 115-B.

IMS network may include an IMS network implemented, for example, in a Multiprotocol Label Switching (MPLS) network implemented in one or more circuit-switched networks and/or packet-switched networks that include a local area network (LAN), a wide area network (WAN), a metropolitan area network (MAN), a cable network, a Public Switched Telephone Network (PSTN), an ad hoc network, an intranet, the Internet, a fiber optic-based network, a wireless network, and/or any combination of these or other types of networks.

First IMS network 130-A may assign a first MDN to UE 110 and second IMS network 130-B may assign a second MDN to UE 110. First IMS network 130-A may include a proxy CSCF (P-CSCF) device 132-A, an interrogating CSCF (I-CSCF) device 134-A, a serving CSCF (S-CSCF) device 136-A, an HSS 138-A, and an AS 140-A. Second IMS network 130-B may include a proxy CSCF (P-CSCF) device 132-B, an interrogating CSCF (I-CSCF) device 134-B, a serving CSCF (S-CSCF) device 136-B, an HSS 138-B, and an AS 140-B.

P-CSCF device 132-A and P-CSCF device 132-B (referred to herein collectively as "P-CSCF devices 132" and individually as "P-CSCF device 132") may function as an edge of IMS network 130 and may enable UE 110 to access IMS network 130. P-CSCF device 132 may maintain information about all IMS endpoints in IMS network 130 and may process SIP signaling messages arriving from, or being sent to, the IMS endpoints (e.g., UE 110).

I-CSCF device 134-A and I-CSCF device 134-B (referred to herein collectively as "I-CSCF devices 134" and individually as "I-CSCF device 134") may interrogate HSS 138 to obtain a location (e.g., address) of a particular S-CSCF device 136 assigned to UE 110 and may act as an intermediary device between P-CSCF device 132 and S-CSCF device 136 and/or between different S-CSCF devices 136.

S-CSCF device 136-A and S-CSCF device 136-B (referred to herein collectively as "S-CSCF devices 136" and individually as "S-CSCF device 136") may process terminating SIP requests and responses associated with endpoint registered with S-CSCF device 136 and may route a SIP message towards a destination (e.g., towards a particular P-CSCF device 132 and/or a particular UE 110)

HSS 138-A and HSS 138-B (referred to herein collectively as "HSSes 138" and individually as "HSS 138") may maintain a database of subscriber records. A subscriber record may identify a UE 110 associated with a subscriber, one or more MDNs associated with the subscriber as well as a home IMS network 130 associated with a particular MDN, a last determined location associated with UE 110, a particular P-CSCF device 132 and/or a particular S-CSCF device 136 currently assigned to UE 110, and/or other type of information associated with a subscriber.

AS 140-A and AS 140-B (referred to herein collectively as "ASes 140" and individually as "AS 140") may perform particular functions for IMS network 130. For example, AS 140 may register an MDN with a foreign IMS network 130 and/or may perform particular functions, such as the functions of an I-CSCF device 134, on behalf of an MDN with respect to a foreign IMS network 130.

While IMS network 130 shows a single P-CSCF device 132, a single I-CSCF device 134, a single S-CSCF device 136, a single HSS 138, and a single AS 140 for illustrative purposes, in practice, IMS network 130 may include multiple P-CSCF devices 132, multiple I-CSCF devices 134, multiple S-CSCF devices 136, multiple HSSes 138, and/or multiple ASes 140.

Provisioning system 150 may provision a subscriber record in HSS 138. For example, provisioning system 150 may generate an IRS for a subscriber with multiple MDNs and may generate a service point trigger in the IRS to require registration of multiple MDNs, such as a first MDN home to IMS network 130-A and a second MDN home to IMS network 130-B. Since the registration requirement is generated by provisioning system 150, which may correspond to a $3^{rd}$ party with respect to IMS network 130-A and IMS network 130-B, the registration requirement stored in service point trigger may be referred to as a $3^{rd}$ party registration request.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100. For example, while FIG. 1 shows two access networks 120 and two IMS network 130 for illustrative purposes, in practice, environment 100 may include a different number of access networks 120 and/or a different number of IMS networks 130.

Figure 2:
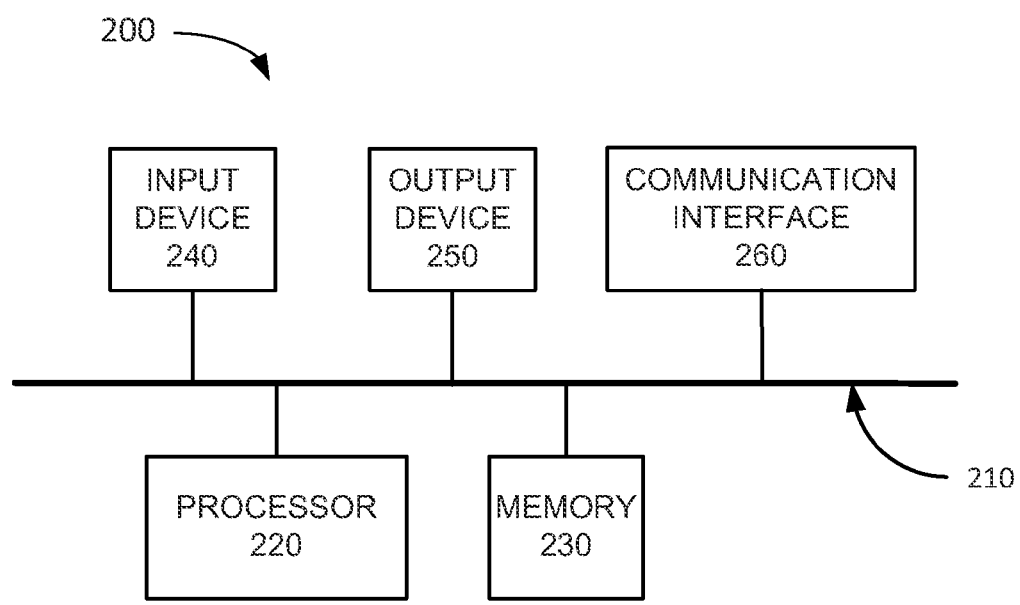
FIG. 2 is a diagram illustrating exemplary components of a device that may be included in one or more components of FIG. 1.

FIG. 2 is a diagram illustrating exemplary components of a device 200 according to an implementation described herein. P-CSCF device 132, I-CSCF device 134, S-CSCF device 136, HSS 138, and/or AS 140 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to registering an MDN with an IMS network. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3:
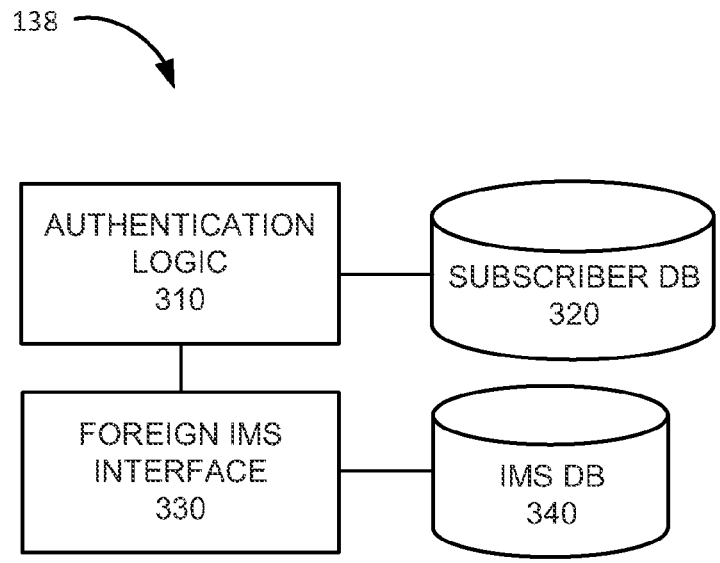
FIG. 3 is a diagram illustrating exemplary functional components of a home subscriber server of FIG. 1.

FIG. 3 is a diagram illustrating exemplary functional components of HSS 138. The functional components of HSS 138 may be implemented, for example, via processor 220 executing instructions from memory 230. Additionally or alternatively, some or all of the functional components of HSS 138 may be hard-wired. As shown in FIG. 3, HSS 138 may include authentication logic 310, subscriber database (DB) 320, foreign IMS interface 330, and an IMS DB 340.

Authentication logic 310 may establish a run-time authentication context for an MDN that is to be registered with IMS network 130. For example, authentication logic 310 may generate an authentication value for the MDN based on a stored private key. Subscriber DB 320 may store subscriber records for subscribers associated with IMS network 130. Exemplary information that may be stored in subscriber DB is described below with reference to FIG. 5.

Foreign IMS interface 330 may enable HSS 138 to communicate with another IMS network. For example, IMS interface 330 may establish a secure communication channel, based on a particular protocol, with AS 140 of another IMS network 130. IMS DB 340 may store information relating to other IMS networks 130, such as, for example, how to reach a particular IMS network 130 (e.g., an IP address of AS 140 of another IMS network 130), authentication information associated with the particular IMS network 130, and/or other information associated with the particular IMS network 130.

Although FIG. 3 shows exemplary functional components of HSS 138, in other implementations, HSS 138 may include fewer functional components, different functional components, differently arranged functional components, or additional functional components than depicted in FIG. 3. Additionally or alternatively, one or more functional components of HSS 138 may perform functions described as being performed by one or more other functional components of HSS 138.

Figure 4:
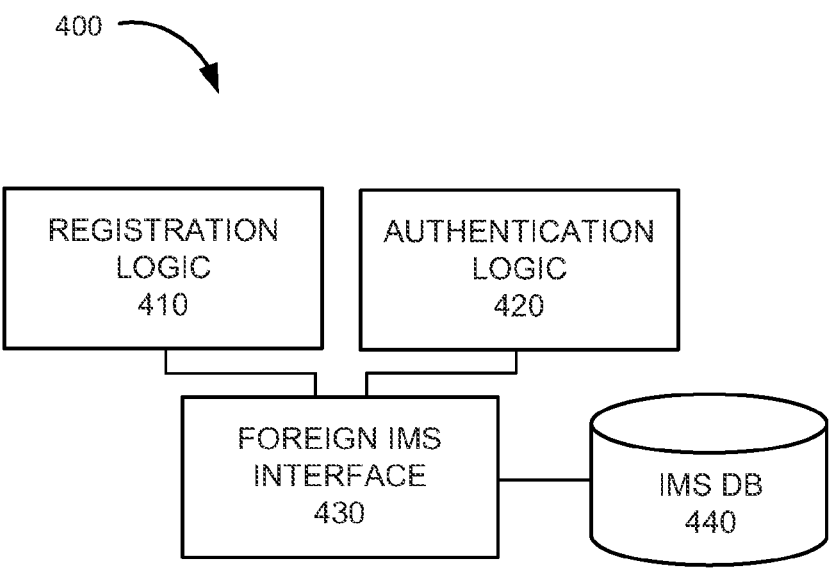
FIG. 4 is a diagram illustrating exemplary functional components of a call session control function device of FIG. 1.

FIG. 4 is a diagram illustrating exemplary functional components of a functional device 400. For example, each of P-CSCF device 132, I-CSCF device 134, S-CSCF device 136, and/or HSS 138 may include one or more functional devices 400. The functional components of functional device 400 may be implemented, for example, via processor 220 executing instructions from memory 230. Additionally or alternatively, some or all of the functional components of functional device 400 may be hard-wired. As shown in FIG. 4, functional device 400 may include a registration logic 410, an authentication logic 420, a foreign IMS interface 430, and an IMS DB 440.

Registration logic 410 may manage registration of an MDN. As an example, registration logic 410 may receive a register request from UE 110 and may forward the register request to another device in IMS network 130. As another example, registration logic 410 may generate a register request on behalf of a MDN and may send a register request to another device of an IMS network 130 or a device of another IMS network 130.

Authentication logic 420 may authenticate a register request for an MDN. For example, authentication logic 420 may receive a run-time authentication value from HSS 138 and may receive an authentication value from UE 110 and may determine whether the two authentication values match. If the two authentication values match, authentication logic 420 may authenticate the registration of the MDN.

Foreign IMS interface 430 may enable functional device 400 to communicate with another IMS network. For example, IMS interface 430 may establish a secure communication channel, based on a particular protocol, with P-CSCF 132, I-CSCF 134, S-CSCF 136, HSS 138, and/or As 140 of another IMS network 130. IMS DB 440 may store information relating to other IMS networks 130, such as, for example, how to reach a particular IMS network 130 (e.g., an IP address of a particular device of another IMS network 130), authentication information associated with the particular IMS network 130, and/or other information associated with the particular IMS network 130. Furthermore, foreign IMS interface 430 may determine, based on, for example, information stored in IMD DB 440, whether registration with a particular IMS network is allowed using a foreign MDN. If registration using a foreign MDN is not allowed, functional device 400 may register with the foreign IMS network using a home MDN.

Although FIG. 4 shows exemplary functional components of functional device 400, in other implementations, functional device 400 may include fewer functional components, different functional components, differently arranged functional components, or additional functional components than depicted in FIG. 4. Additionally or alternatively, one or more functional components of functional device 400 may perform functions described as being performed by one or more other functional components of functional device 400.

Figure 5:
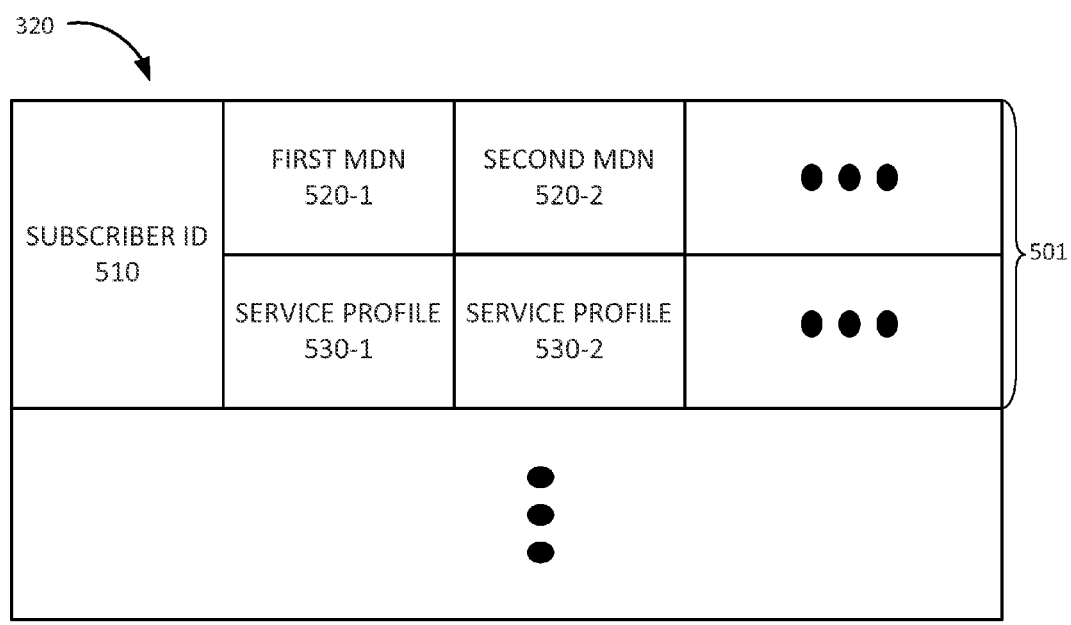
FIG. 5 is a diagram of exemplary information that may be stored in implicit registration set according to an implementation described herein.

FIG. 5 is a diagram of exemplary information that may be stored in subscriber DB 320 according to an implementation described herein. Subscriber DB 320 may store information relating to subscribers of IMS network 130, such as information identifying a particular subscriber (e.g., a name, an account number, etc.); information identifying UE 110 associated with the particular subscriber (e.g., an International Mobile Subscriber Identity (IMSI) number, an International Mobile Equipment Identifier (IMEI), an Integrated Circuit Card Identifier (ICCI), etc.); a last determined location associated with UE 110; a particular P-CSCF device 132 and/or a particular S-CSCF device 136 currently assigned to UE 110; and/or other type of information associated with a subscriber (not shown in FIG. 5).

Furthermore, subscriber DB 320 may store one or more IRSs 501. Each IRS record 501 may be associated with a particular subscriber and/or may be part of the subscriber's record. IRS record 501 may store information relating to MDNs associated with a particular subscriber. IRS record 501 may include a subscriber ID field 510, a first MDN field 520-1, a second MDN field 520-2, a first service profile field 530-1, and a second service profile field 530-2.

Subscriber ID field 510 may store a unique identifier associated with a particular subscriber. First MDN field 520-1 may store a first MDN (e.g., a personal telephone number) associated with the particular subscriber. Furthermore, first MDN field 520-1 may store information identifying one or more UEs 110 associated with the first MDN. Multiple UEs may be associated with an MDN to permit the implementation of a "bridged line appearance" where a call to an MDN simultaneously "rings" at the multiple UEs 110 associated with the MDN. "Bridged line appearance" may occur when one identity is shared across two UEs 110. Furthermore, first MDN field 520-1 may identify a home IMS network 130 associated with the first MDN.

Second MDN field 520-2 may store a second MDN (e.g., a corporate telephone number) associated with the particular subscriber. Furthermore, second MDN field 520-2 may store information identifying one or more UEs 110 associated with the second MDN. Multiple UEs may be associated with an MDN to permit the implementation of a "bridged line appearance." Furthermore, second MDN field 520-2 may identify a home IMS network 130 associated with the second MDN. IRS record 501 may include additional MDN fields. Each additional MDN field may store information relating to an additional MDN associated with the particular subscriber and may be associated with an additional service profile field 530.

Service profile field 530-1 may store a service profile associated with the first MDN. The service profile may specify particular services associated with the first MDN identified in IRS record 501. For example, service profile field 530-1 may store a service point trigger that requires registration of both the first MDN and the second MDN (and/or additional MDNs that may be stored in IRS record 501) when a register request is detected for the first MDN. Thus, HSS 138 may be configured to receive an indication that the first MDN has been registered with IMS network 130-A and to send an indication (e.g., to S-CSCF device 136-A) to register the second MDN with IMS network 130-B, in response to receiving the indication that the first MDN has been registered with IMS network 130-A.

Service profile field 530-2 may store a service profile associated with the second MDN. The service profile may specify particular services associated with the second MDN identified in IRS record 501. For example, service profile field 530-2 may store a service point trigger that requires registration of both the second MDN and the first MDN (and/or additional MDNs that may be stored in IRS record 501) when a register request is detected for the second MDN. Thus, HSS 138 may be configured to receive an indication that the second MDN has been registered with IMS network 130-B and to send an indication (e.g., to S-CSCF device 136-B) to register the first MDN with IMS network 130-A, in response to receiving the indication that the second MDN has been registered with IMS network 130-B.

Figure 6:
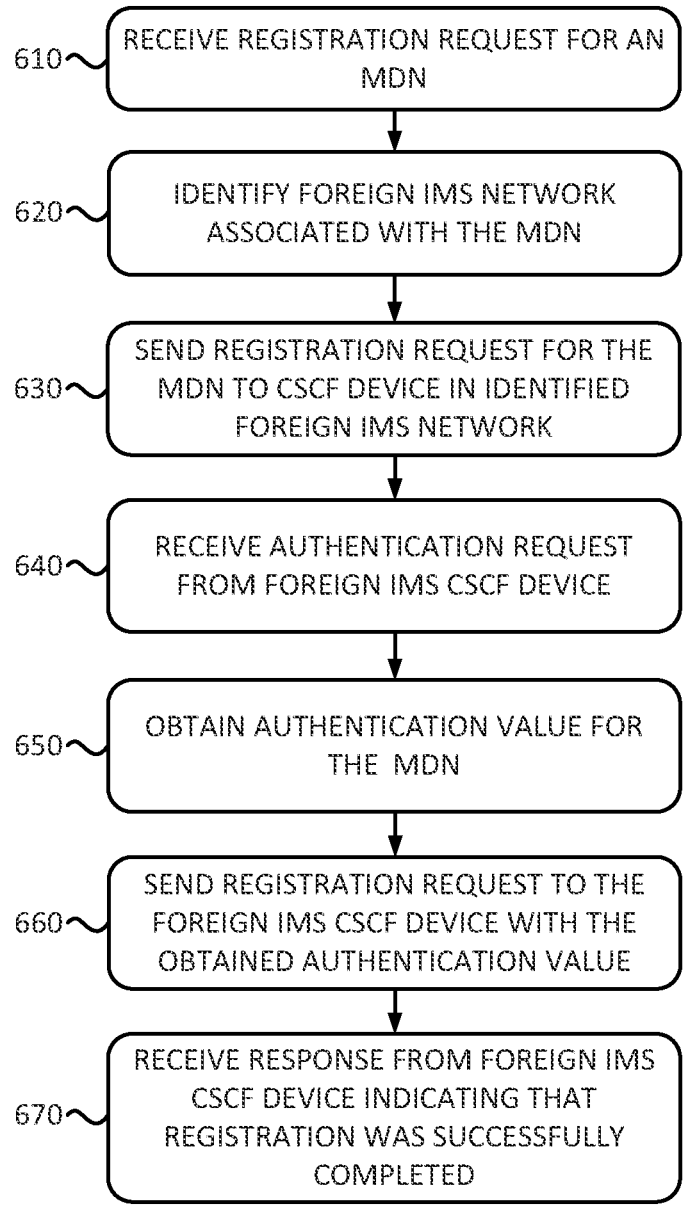
FIG. 6 is a flow chart of first exemplary processing of a registration with a second Internet Protocol Multimedia Subsystem network according to an implementation described herein.

FIG. 6 is a flow chart of first exemplary processing of a registration with a foreign IMS network according to an implementation described herein. In one implementation, the process of FIG. 6 may be performed by AS 140. In other implementations, some or all of the process of FIG. 6 may be performed by another device or a group of devices separate from AS 140 and/or including AS 140. The process of FIG. 6 is further illustrated below with reference to the signal flows of FIGS. 11 and 13 in connection with AS 140-A.

The process of FIG. 6 may include receiving a registration request for an MDN (block 610). As an example, AS 140-A may receive a $3^{rd}$ party register request to register a foreign MDN with a foreign IMS network from S-CSCF device 136-A. As another example, AS 140-A may receive a $3^{rd}$ party register request to register a home MDN with a foreign IMS network from S-CSCF device 136-A. The register request may include location information associated with UE 110. A foreign IMS network, associated with the MDN, may be identified (block 620). For example, AS 140-A may identify a foreign IMS network associated with the MDN based on information stored in IMS DB 440.

A registration request may be sent for the MDN to a CSCF device in the identified foreign IMS network (block 630). As an example, AS 140-A may obtain the location of S-CSCF device 136-B from HSS 140-B and, if registration with a foreign MDN is allowed and foreign MDN is available, may send a SIP REGISTER request for a foreign MDN to S-CSCF device 136-B. As another example, if registration with a foreign MDN is allowed and foreign MDN is available, AS 140-A may send a SIP REGISTER request for a foreign MDN to P-CSCF device 132. As yet another example, AS 140-A may obtain the location of S-CSCF device 136-B from HSS 140-B and, if registration with a foreign MDN is not allowed or the foreign MDN is not available, may send a SIP REGISTER request for a home MDN to S-CSCF device 136-B. As yet another example, if registration with a foreign MDN is not allowed or the foreign MDN is not available, AS 140-A may send a SIP REGISTER request for a home MDN to P-CSCF device 132.

An authentication request may be received from the foreign IMS CSCF device (block 640) and an authentication value may be obtained for the MDN (block 650). For example, AS 140-A may receive an "unauthorized" response from the foreign IMS CSCF device (e.g., either P-CSCF device 132-B or S-CSCF device 136-B) and may obtain an authentication value for the MDN from UE 110.

A registration request may be sent to the foreign IMS CSCF device with the obtained authentication value (block 660) and a response may be received from the foreign IMS CSCF device, indicating that the registration was successfully completed (block 670). As an example, if registration with a foreign MDN is allowed and the foreign MDN is available, AS 140-A may obtain the location of S-CSCF device 136-B from HSS 140-B, may re-send the SIP REGISTER request for the foreign MDN with the obtained authentication value to S-CSCF device 136-B, and may receive a SIP 200 OK message from S-CSCF device 136-B, indicating that the registration was successful. As another example, if registration with a foreign MDN is allowed and the foreign MDN is available, AS 140-A may re-send the SIP REGISTER request for a foreign MDN with the obtained authentication value to P-CSCF device 132, and may receive a SIP 200 OK message from S-CSCF device 136-B, indicating that the registration was successful. As yet another example, if registration with a foreign MDN is not allowed or the foreign MDN is available, AS 140-A may obtain the location of S-CSCF device 136-B from HSS 140-B, may re-send the SIP REGISTER request for the home MDN with the obtained authentication value to S-CSCF device 136-B, and may receive a SIP 200 OK message from S-CSCF device 136-B, indicating that the registration was successful. As yet another example, if registration with a foreign MDN is not allowed or the foreign MDN is available, AS 140-A may re-send the SIP REGISTER request for a home MDN with the obtained authentication value to P-CSCF device 132, and may receive a SIP 200 OK message from S-CSCF device 136-B, indicating that the registration was successful.

Figure 7:
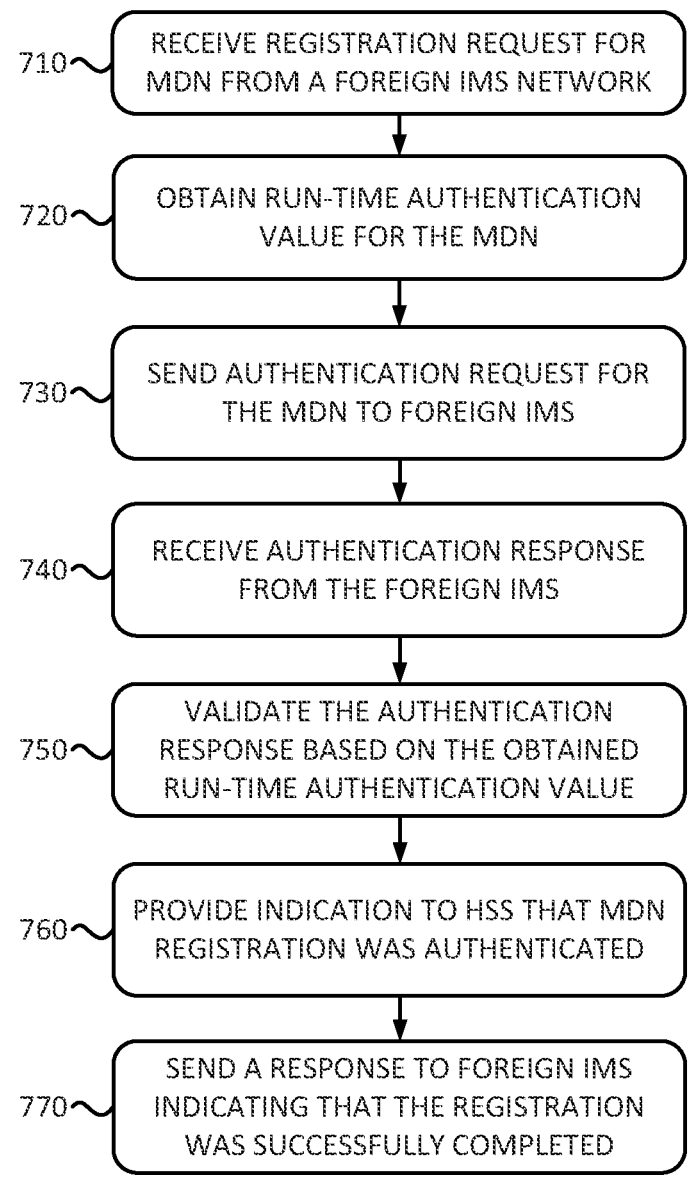
FIG. 7 is a flow chart of second exemplary processing of a registration request to a second Internet Protocol Multimedia Subsystem network according to an implementation described herein.

FIG. 7 is a flow chart of second exemplary processing of a registration request to a second Internet Protocol Multimedia Subsystem network according to an implementation described herein. In one implementation, the process of FIG. 7 may be performed by S-CSCF device 136. In other implementations, some or all of the process of FIG. 7 may be performed by another device or a group of devices separate from S-CSCF device 136 and/or including S-CSCF device 136. The process of FIG. 7 is further illustrated below with reference to the signal flows of FIGS. 11 and 13 in connection with S-CSCF device 136-B.

The process of FIG. 7 may include receiving a registration request for an MDN from a foreign IMS network (block 710). The registration request may include location information associated with UE 110. As an example, S-CSCF device 136-B may receive a register request for a home MDN from AS 140-A. As another example, S-CSCF device 136-B may receive a register request for a foreign MDN from AS 140-A. A run-time authentication value for the MDN may be obtained (block 720). As an example, S-CSCF device 136-B may obtain a run-time authentication value for a home MDN from HSS 140-B. As another example, S-CSCF device 136-B may obtain a run-time authentication value for a foreign MDN from HSS 140-B.

An authentication request for the MDN may be sent to the foreign IMS (block 730) and an authentication response may be received from the foreign IMS (block 740). As an example, S-CSCF device 136-B may send an "unauthorized" response back to AS 140-A, indicating that the received register request is unauthorized and requesting an authentication value for the registration of the home MDN. As another example, S-CSCF device 136-B may send an "unauthorized" response back to AS 140-A, indicating that the received register request is unauthorized and requesting an authentication value for the registration of the foreign MDN. S-CSCF device 136-B may receive another register request from AS 140-B for the home MDN, or for the foreign MDN, which includes the requested authentication value.

The authentication response may be validated based on the obtained run-time authentication value (block 750), an indication may be provided to the HSS that the MDN registration was authenticated (block 760), and a response may be sent to the foreign IMS indicating that the registration was successfully completed (block 770). For example, S-CSCF device 136-B may determine whether the authentication value received from AS 140-A matches the run-time authentication value obtained from HSS 138-B. If the two authentication values match, S-CSCF device 136-B may send an indication to HSS 138-B indicating that the MDN has been authenticated. HSS 138-B may update a subscriber record, associated with the MDN, with the location information associated with the MDN, and may update the subscriber record to indicate that the MDNs associated with the subscriber are registered and active. Furthermore, S-CSCF device 136-B may send a SIP 200 OK message back to AS 140-A if the two values match, indicating that the home MDN, or the foreign MDN, has been successfully registered with IMS network 130-B.

Figure 8:
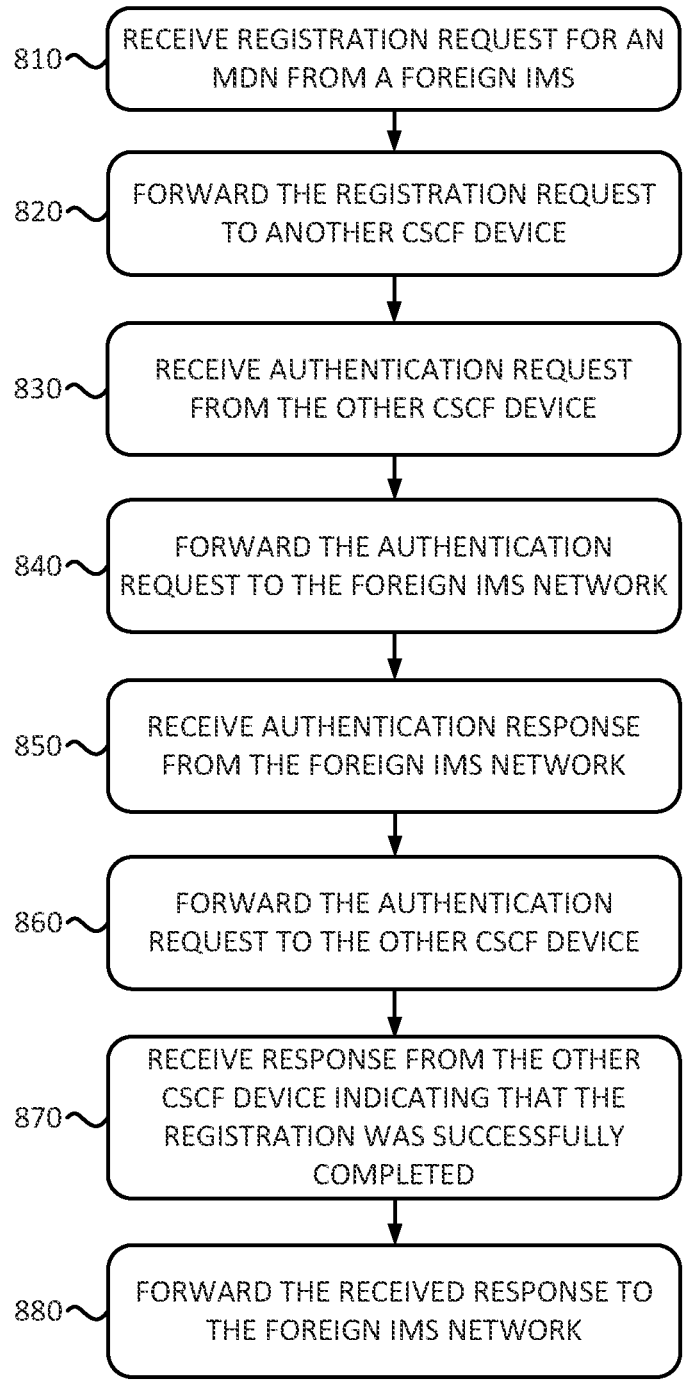
FIG. 8 is a flow chart of third exemplary processing of a registration with a second Internet Protocol Multimedia Subsystem network according to an implementation described herein.

FIG. 8 is a flow chart of third exemplary processing of a registration with a second Internet Protocol Multimedia Subsystem network according to an implementation described herein. In one implementation, the process of FIG. 8 may be performed by P-CSCF device 132. In other implementations, some or all of the process of FIG. 8 may be performed by another device or a group of devices separate from P-CSCF device 132 and/or including P-CSCF device 132. The process of FIG. 8 is further illustrated below with reference to the signal flows of FIGS. 12 and 14 in connection with P-CSCF device 132-B.

The process of FIG. 8 may include receiving a registration request for an MDN from a foreign IMS network (block 810). The registration request may include location information associated with UE 110. As an example, P-CSCF device 132-B may receive a register request for a home MDN from AS 140-A. As another example, P-CSCF device 132-B may receive a register request for a foreign MDN from AS 140-A. The registration request may be forwarded to another CSCF device (block 820). For example, P-CSCF device 132-B may forward the registration request to I-CSCF device 134-B.

An authentication request may be received from the other CSCF device (block 830) and forwarded to the foreign IMS (block 840). For example, P-CSCF device 132-B may receive an "unauthorized" response, requesting an authentication value for the MDN, from I-CSCF device 134-B and may forward the authentication request to AS 140-A. An authentication response may be received from the foreign IMS network (block 850) and forwarded to the other CSCF device (block 860). For example, P-CSCF device 132-B may receive another register request from AS 140-B for the home MDN, or for the foreign MDN, which includes the requested authentication value, and may forward the register request to I-CSCF device 134-B.

A response may be received from the other CSCF device, indicating that the registration was completed successfully (block 870), and the response may be forwarded to the foreign IMS network (block 880). For example, P-CSCF device 132-B may receive a SIP 200 OK message in response to the register request for the home MDN, or for the foreign MDN, from I-CSCF device 134-B, and may forward the SIP 200 OK message to AD 140-A.

Figure 9:
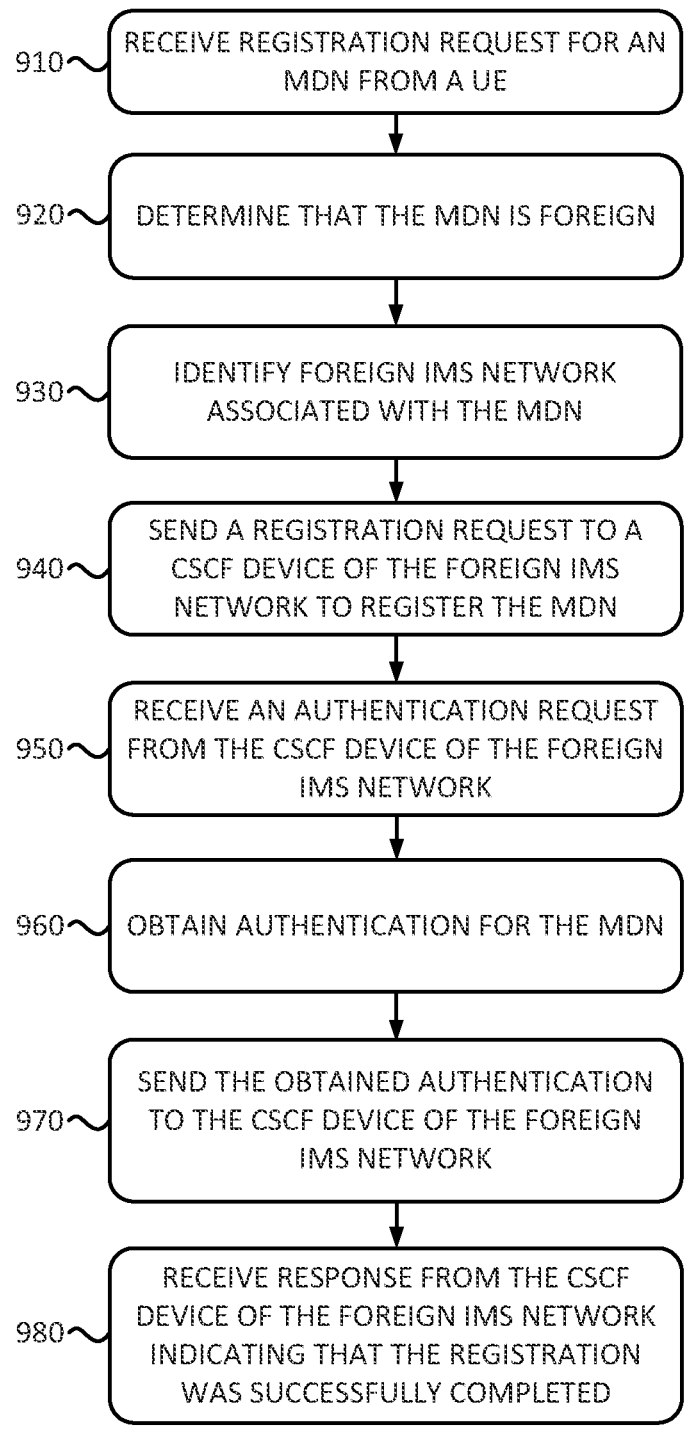
FIG. 9 is a flow chart of fourth exemplary processing of a registration with a second Internet Protocol Multimedia Subsystem network according to an implementation described herein.

FIG. 9 is a flow chart of fourth exemplary processing of a registration with a second Internet Protocol Multimedia Subsystem network according to an implementation described herein. In one implementation, the process of FIG. 9 may be performed by P-CSCF device 132. In other implementations, some or all of the process of FIG. 9 may be performed by another device or a group of devices separate from P-CSCF device 132 and/or including P-CSCF device 132. The process of FIG. 9 is further illustrated below with reference to the signal flows of FIGS. 15-18 in connection with P-CSCF device 132-B.

The process of FIG. 9 may include receiving a registration request for an MDN from a UE (block 910). The registration request may include location information associated with UE 110. As an example, P-CSCF device 132-B may receive a SIP REGISTER request from UE 110 for a foreign MDN. For example, a home MDN for IMS network 130-B may not be available to UE 110 when UE 110 is in a service area associated with IMS network 130-B and UE 110 may need to register with IMS network 130-B using an MDN that is foreign to IMS network 130-B.

A determination may be made that the MDN is foreign (block 920) and a foreign IMS network associated with the MDN may be identified (block 930). For example, P-CSCF 132-A may determine that the MDN is foreign to IMS network 130-B and may identify the foreign IMS network (e.g., IMS network 130-A) based on information stored in IMS database 440.

A registration request may be sent to a CSCF device of the foreign IMS network to register the MDN (block 940). For example, P-CSCF device 132-B may forward the register request to I-CSCF device 134-A. An authentication request may be received from the CSCF device of the foreign IMS network (block 950). For example, P-CSCF device 132-B may receive an "unauthorized" response, requesting an authentication value for the MDN, from I-CSCF device 134-A and may forward the authentication request to UE 110.

An authentication for the MDN may be obtained (block 960) the obtained authentication may be sent to the CSCF device of the foreign IMS network (block 970). For example, P-CSCF device 132-B may receive another register request from UE 110 for the foreign MDN, which includes the requested authentication value, and may forward the register request to I-CSCF device 134-A.

A response may be received from the CSCF device of the foreign IMS network, indicating that the registration was successfully completed (block 980). For example, P-CSCF device 132-B may receive a SIP 200 OK message in response to the register request for the foreign MDN from I-CSCF device 134-A and may forward the SIP 200 OK message to UE 110.

Figure 10:
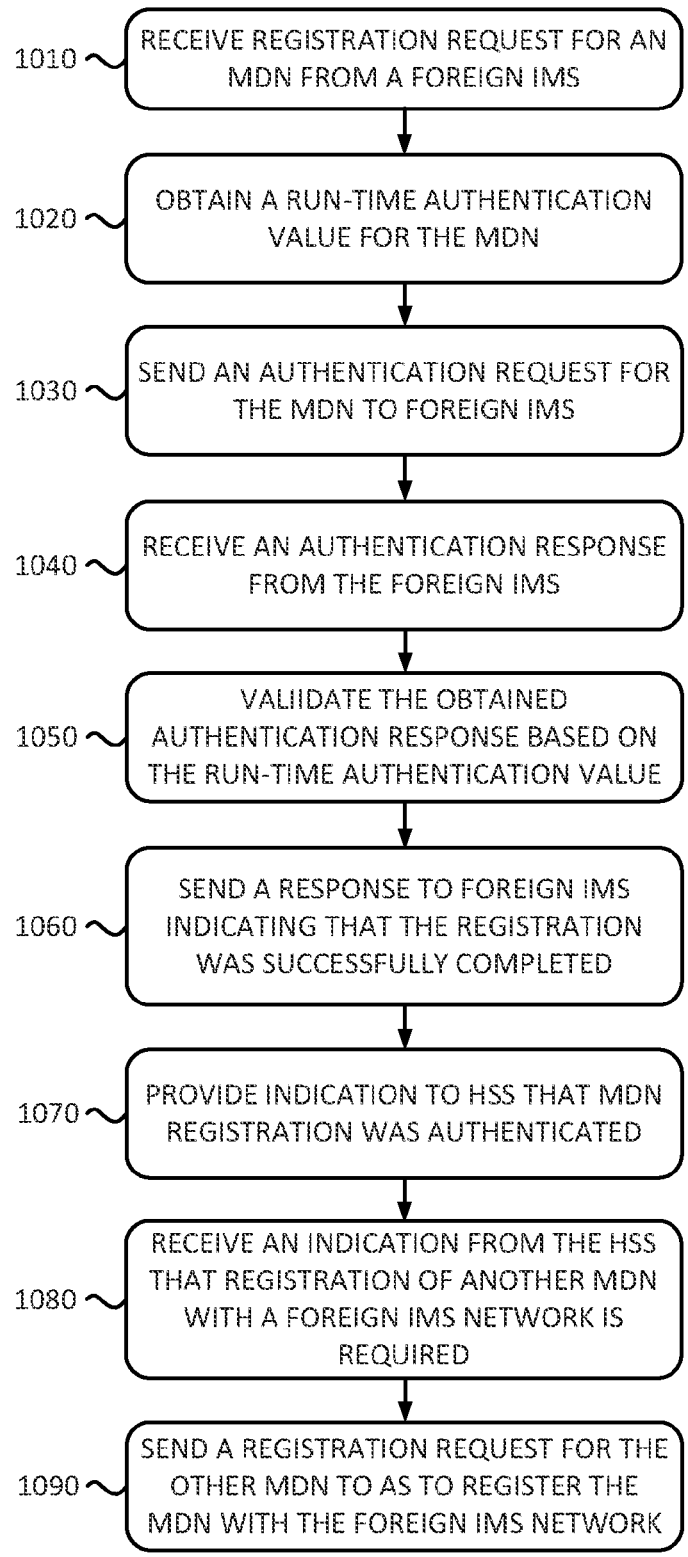
FIG. 10 is a flow chart of fifth exemplary processing of a registration with a second Internet Protocol Multimedia Subsystem network according to an implementation described herein.

FIG. 10 is a flow chart of fifth exemplary processing of a registration with a second Internet Protocol Multimedia Subsystem network according to an implementation described herein. In one implementation, the process of FIG. 10 may be performed by AS 140. In other implementations, some or all of the process of FIG. 10 may be performed by another device or a group of devices separate from AS 140 and/or including AS 140. The process of FIG. 10 is further illustrated below with reference to the signal flows of FIGS. 15-18 in connection with S-CSCF device 136-A.

The process of FIG. 10 may include receiving a registration request for an MDN from a foreign IMS (block 1010). For example, S-CSCF device 136-A may receive a register request for a home MDN from P-CSCF device 132-A. The registration request may include location information associated with UE 110. A run-time authentication value for the MDN may be obtained (block 1020). As an example, S-CSCF device 136-A may obtain a run-time authentication value for the home MDN from HSS 140-A. An authentication request for the MDN may be sent to the foreign IMS (block 1030) and an authentication response may be received from the foreign IMS (block 1040). As an example, S-CSCF device 136-A may send an "unauthorized" response back to P-CSCF device 132-A, indicating that the received register request is unauthorized and requesting an authentication value for the registration of the home MDN. P-CSCF device 132-A may forward the authentication request to P-CSCF device 132-B and P-CSCF device 132-B may forward the request to UE 110. S-CSCF device 136-A may receive another register request from UE 110 via P-CSCF device 132-B and P-CSCF device 132-A.

The authentication response may be validated based on the obtained run-time authentication value (block 1050) and a response may be sent to the foreign IMS indicating that the registration was successfully completed (block 1060). For example, S-CSCF device 136-A may determine whether the authentication value received from P-CSCF device 132-A matches the run-time authentication value obtained from HSS 138-A and S-CSCF device 136-A may send a SIP 200 OK message back to UE 110 via P-CSCF device 132-A and P-CSCF device 132-B if the two values match, indicating that the home MDN has been successfully registered with IMS network 130-A.

An indication may be provided to the HSS that the MDN registration was authenticated (block 1070) and an indication may be received from the HSS that the registration of another MDN with a foreign IMS network is required (block 1080). For example, if the two authentication values match, S-CSCF device 136-A may send an indication to HSS 138-A indicating that the MDN has been authenticated. HSS 138-B may update a subscriber record, associated with the MDN, with the location information associated with the MDN, and may update the subscriber record to indicate that the MDN associated with the subscriber are registered and active. Furthermore, HSS may detect a service point trigger in the service profile associated with the subscriber that another MDN is to be registered with a foreign IMS network and may send an indication to S-CSCF device 136-A to register the other MDN. A registration request for the other MDN may be sent to an AS to register the MDN with the foreign IMS network (block 1090). For example, S-CSCF device 136-A may send a registration request for the other MDN to AS 140-A and AS 140-A may initiate a registration procedure for the foreign MDN with the foreign IMS network (e.g., IMS network 130-B), as explained above with reference to FIG. 6.

Figure 11:
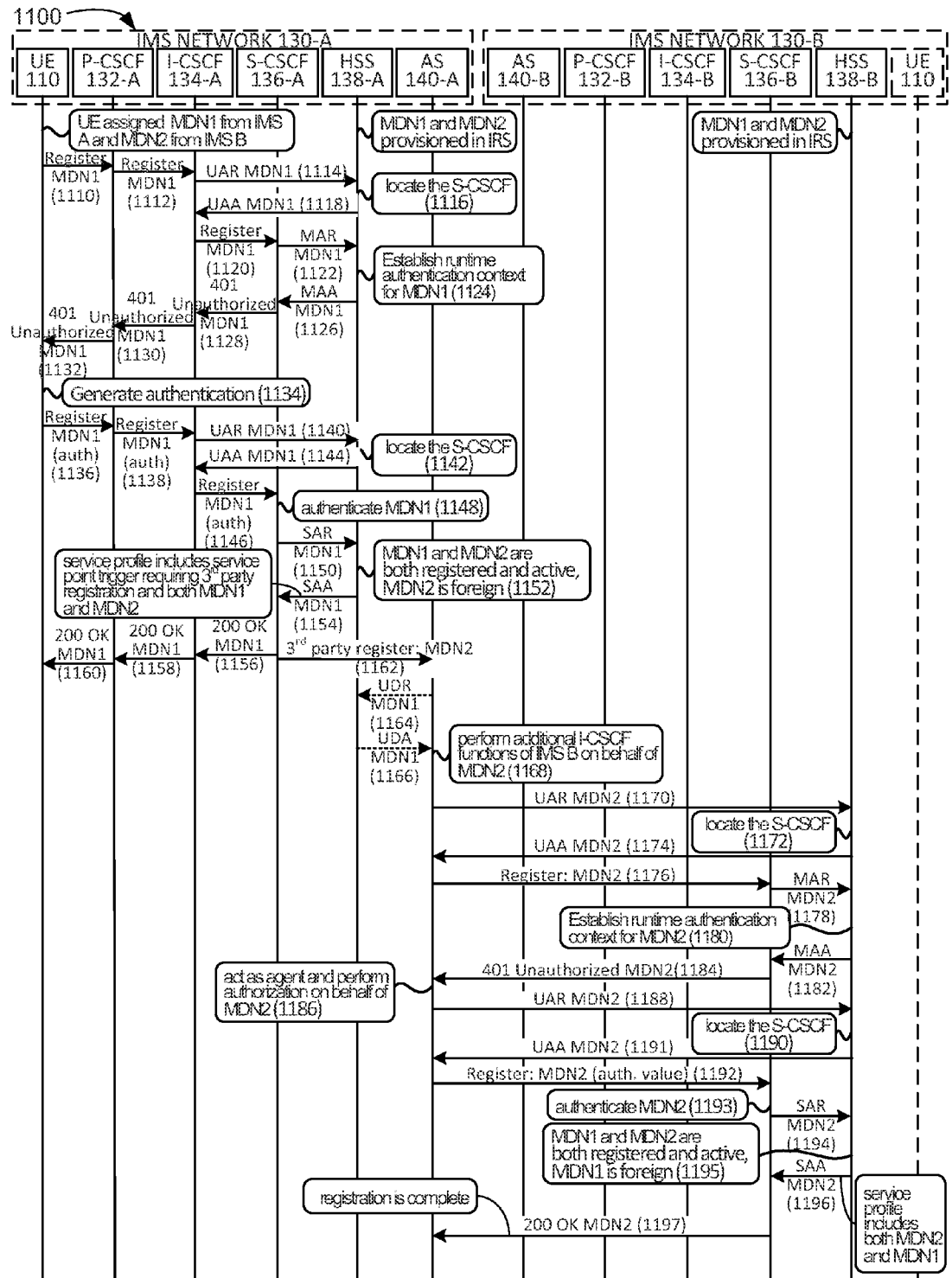
FIG. 11 is an exemplary signal flow diagram illustrating a first implementation of registering a mobile directory number with a second Internet Protocol Multimedia Subsystem network according to an implementation described herein.

FIG. 11 is an exemplary signal flow diagram 1100 illustrating a first implementation of registering a mobile directory number with a second Internet Protocol Multimedia Subsystem network according to an implementation described herein. As shown in FIG. 11, signal flow diagram 1100 includes interactions between IMS network 130-A and IMS network 130-B. In the implementation shown in FIG. 11, mobile directory numbers MDN1 and MDN2 are available in UE 110, IMS network 130-A is home to MDN1, IMS network 130-B is home to MDN2, registration is started in IMS network 130-A using the home MDN (MDN1), and registration with the second IMS network (IMS network 130-B) is performed with via the home AS (AS 140-A) and the foreign IMS network S-CSCF (S-CSCF device 136-B) using the MDN foreign to the first network (MDN2).

The signal flow may begin with UE 110 powering up and sending a register request (e.g. a SIP REGISTER message) to P-CSCF device 132-A for MDN1 via access network 120-A (signal 1110). P-CSCF device 132-A may forward the register request for MDN1 to I-CSCF device 134-A (signal 1112) and I-CSCF device 134-A may interrogate HSS 138-A for the location of S-CSCF device 136-A by sending a Diameter protocol user authorization request (UAR) for MDN1 to HSS 138-A (signal 1114). HSS 138-A may locate S-CSCF device 136-A (signal 1116) and may send a Diameter protocol user authorization answer (UAA) for MDN1 back to I-CSCF device 134-A with the location of S-CSCF device 136-A (signal 1118).

I-CSCF device 134-A may, in response to receiving information about the location of S-CSCF device 136-A, forward the registration request for MDN1 to S-CSCF device 136-A (signal 1120). S-CSCF device 136-A may respond by sending a Diameter protocol multimedia authorization request (MAR) for MDN1 to HSS 138-A (signal 1122). HSS 138-A may establish a run-time authentication context for MDN1, which may generate an authentication value, based on, for example, a stored private key, to be used to authenticate MDN1 (signal 1124) and may send a Diameter protocol multimedia authorization answer (MAA) for MDN1 back to S-CSCF device 136-A (signal 1126). The MAA may include the generated authentication value. S-CSCF device 136-A may send an unauthorized response, requesting an authentication value for MDN1, back to UE 110, via I-CSCF device 134-A and P-CSCF device 132-A (signals 1128, 1130, and 1132).

UE 110 may generate an authentication value for MDN1, based on, for example, a stored private key, in response to receiving the authorization request (signal 1134) and may re-send the register request for MDN1 to P-CSCF device 132-A for MDN1 (signal 1136) and P-CSCF device 132-A may forward the register request to I-CSCF device 134-A (signal 1138). I-CSCF device 134-A may interrogate HSS 138-A for the location of S-CSCF device 136-A by sending a UAR for MDN1 to HSS 138-A (signal 1140). HSS 138-A may locate S-CSCF device 136-A (signal 1142) and may send a UAA for MDN1 back to I-CSCF device 134-A with the location of S-CSCF device 136-A (signal 1144).

I-CSCF device 134-A may, in response to receiving information about the location of S-CSCF device 136-A, forward the register request for MDN1, with the authentication value, to S-CSCF device 136-A (signal 1146). S-CSCF device 136-A may authenticate the register request using the authentication value generated by HSS 138-A (signal 1148) and may send a Diameter protocol server assignment request (SAR) for MDN1 to HSS 138-A (signal 1150). HSS 138-A may determine, based on IRS record 501, associated with MDN1, that MDN1 and MDN2 are associated with UE 110 and may, in response to MDN1 being activated, update IRS record 501, and/or other records associated with the subscriber of UE 110, that both MDN1 and MDN2 are registered and active for UE 110, with MDN2 being foreign (signal 1152).

HSS 138-A may send a Diameter protocol server assignment answer (SAA) for MDN1 back to S-CSCF device 136-A (signal 1154). S-CSCF device 136-A may send a SIP 200 OK message for MDN1 back to UE 110, via I-CSCF device 134-A and P-CSCF device 132-A (signals 1156, 1158, and 1160), indicating that MDN1 was successfully registered. Furthermore, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

In response to detecting the service point trigger, S-CSCF device 136-A may determine that $3^{rd}$ party registration with a foreign IMS network using a foreign MDN is allowed, and may send a $3^{rd}$ party register request to AS 140-A to register MDN2 with IMS network 130-B (signal 1162). AS 140-A may send a Diameter protocol user data request (UDR) to HSS 138-A (signal 1164) to obtain information associated with MDN2, such as the address of HSS 138-B. HSS 138-A may provide the information associated with MDN2 to AS 140-A in a Diameter protocol user data answer (UDA) (signal 1166). AS 140-A may perform additional I-CSCF functions of IMS network 130-B on behalf of MDN2, such as interrogating HSS 138-B for the location of a particular S-CSCF device 136-B associated with UE 110 (signal 1168).

AS 140-A may interrogate HSS 138-B for the location of S-CSCF device 136-B by sending a UAR for MDN2 to HSS 138-B (signal 1170). HSS 138-B may locate S-CSCF device 136-B (signal 1172) and may send a UAA back to AS 140-A with the location of S-CSCF device 136-B (signal 1174). AS 140-A may, in response to receiving information about the location of S-CSCF device 136-B, forward the register request for MDN2 to S-CSCF device 136-B (signal 1176). S-CSCF device 136-B may respond by sending an MAR for MDN2 to HSS 138-B (signal 1178). HSS 138-B may establish a run-time authentication context for MDN2, which may generate an authentication value, based on, for example, a stored private key, to be used to authenticate MDN2 (signal 1180) and may send a MAA for MDN2 back to S-CSCF device 136-B (signal 1182). The MAA may include the generated authentication value. S-CSCF device 136-B may send an unauthorized response, requesting an authentication value, back to AS 140-A (signal 1184).

AS 140-A may act as a SIP user agent for MDN2 and may perform the authorization procedure for MDN2 to generate an authentication value for MDN2, based on, for example, a private key obtained from HSS 138-A in the UDA message, in response to receiving the authorization request (signal 1186). AS 140-A may interrogate HSS 138-B for the location of S-CSCF device 136-B by sending a UAR for MDN2 to HSS 138-B (signal 1188). HSS 138-B may locate S-CSCF device 136-B (signal 1190) and may send a UAA for MDN2 back to AS 140-A with the location of S-CSCF device 136-B (signal 1191).

AS 140-A may re-send the register request for MDN2 with the generated authentication value to S-CSCF device 136-B (signal 1192). S-CSCF device 136-B may authenticate the register request using the authentication value generated by HSS 138-B (signal 1193) and may send a SAR for MDN2 to HSS 138-B (signal 1194). HSS 138-B may determine, based on IRS record 501, associated with MDN2, that MDN1 and MDN2 are associated with UE 110 and may, in response to MDN2 being registered, update IRS record 501, and/or other records associated with the subscriber of UE 110, that both MDN1 and MDN2 are registered and active for UE 110, with MDN1 being foreign to IMS network 130-B (signal 1195). HSS 138-B may send an SAA for MDN2 back to S-CSCF device 136-B (signal 1196). The SAA may indicate that the service profile for UE 110 includes both MDN1 and MDN2. S-CSCF device 136-B may send a SIP 200 OK message back to AS 140-A (signal 1197), indicating that MDN2 was successfully registered. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 11 may be performed with IMS networks 130-A and 130-B reversing roles and with MDN1 and MDN2 reversing roles.

Figure 12:
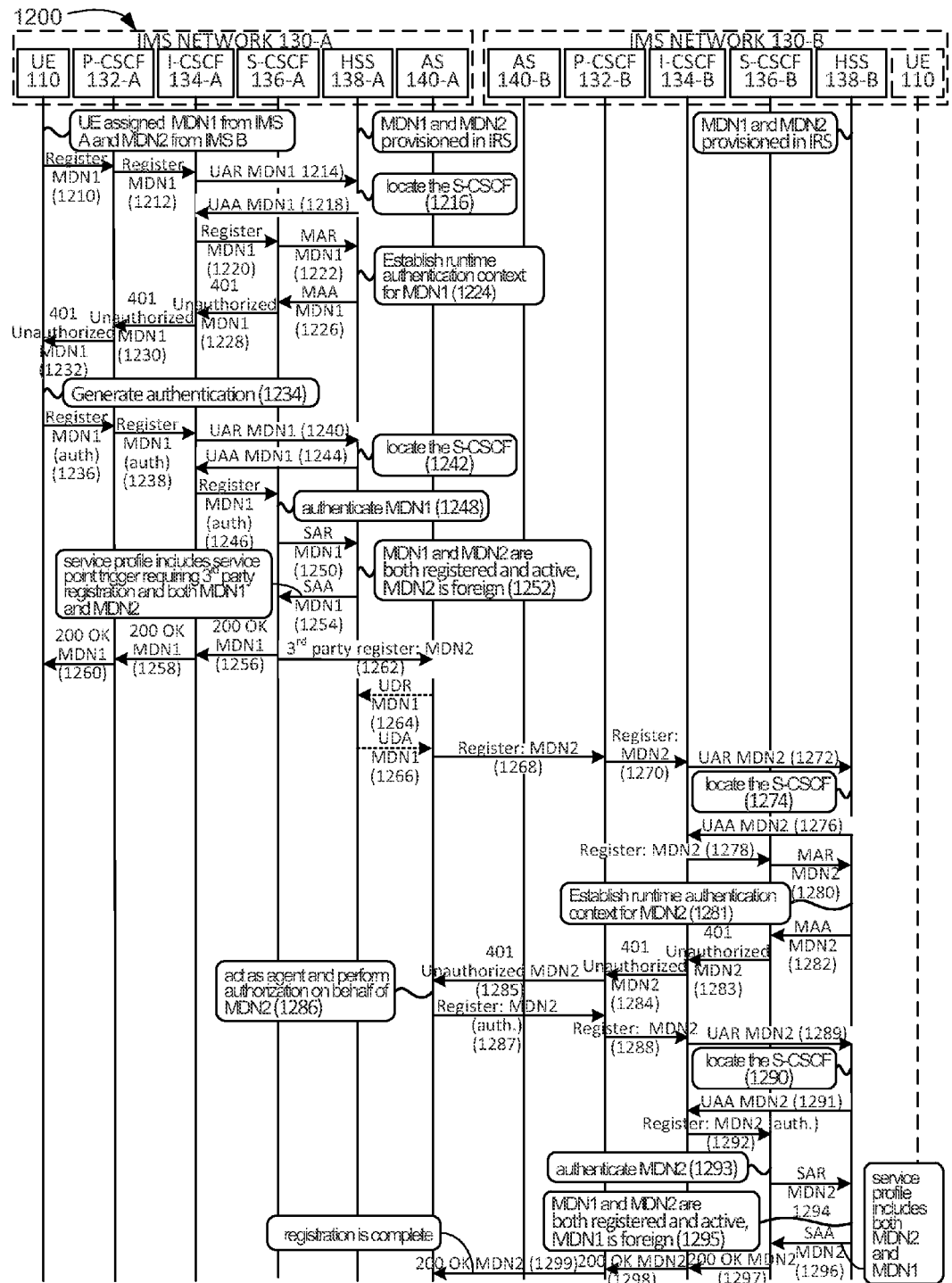
FIG. 12 is an exemplary signal flow diagram illustrating a second implementation of registering a mobile directory number with a second Internet Protocol Multimedia Subsystem network according to an implementation described herein.

FIG. 12 is an exemplary signal flow diagram 1200 illustrating a second implementation of registering a mobile directory number with a second Internet Protocol Multimedia Subsystem network according to an implementation described herein. As shown in FIG. 12, signal flow diagram 1200 includes interactions between IMS network 130-A and IMS network 130-B. In the implementation shown in FIG. 12, mobile directory numbers MDN1 and MDN2 are available in UE 110, IMS network 130-A is home to MDN1, IMS network 130-B is home to MDN2, registration is started in IMS network 130-A using the home MDN (MDN1), and registration with the second IMS network (IMS network 130-B) is performed with via the home AS (AS 140-A) and the foreign IMS network P-CSCF (P-CSCF device 132-B) using the MDN foreign to the first network (MDN2).

The signal flow may begin with UE 110 registering MDN1 with IMS network 130-A, using signal flows 1210-1260. Signal flows 1210-1260 may be analogous to signal flows 1110-1160 explained above with reference to FIG. 11. As explained above with respect to signal 1154, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

In response to detecting the service point trigger, S-CSCF device 136-A may determine that $3^{rd}$ party registration with a foreign IMS network using a foreign MDN is allowed, and may send a $3^{rd}$ party register request to AS 140-A to register MDN2 with IMS network 130-B (signal 1262). AS 140-A may send a UDR to HSS 138-A (signal 1264) to obtain information associated with MDN2, such as the address of P-CSCF device 132-B. HSS 138-A may provide the information associated with MDN2 to AS 140-A in a UDA (signal 1266).

In response to receiving UDA, AS 140-A may send a register request for MDN2 to P-CSCF device 132-B (signal 1268). P-CSCF device 132-B may forward the register request to I-CSCF device 134-B (signal 1270). I-CSCF device 134-B may interrogate HSS 138-B for the location of S-CSCF device 136-B by sending a UAR for MDN2 to HSS 138-B (signal 1272). HSS 138-B may locate S-CSCF device 136-B (signal 1274) and may send a UAA back to I-CSCF device 134-B with the location of S-CSCF device 136-B (signal 1276). I-CSCF device 134-B may, in response to receiving information about the location of S-CSCF device 136-B, forward the register request for MDN2 to S-CSCF device 136-B (signal 1278). S-CSCF device 136-B may respond by sending an MAR for MDN2 to HSS 138-B (signal 1280). HSS 138-B may establish a run-time authentication context for MDN2, which may generate an authentication value, based on, for example, a stored private key, to be used to authenticate MDN2 (signal 1281) and may send a MAA for MDN2 back to S-CSCF device 136-B (signal 1282). The MAA may include the generated authentication value. S-CSCF device 136-B may send an unauthorized response, requesting an authentication value, back to AS 140-A via I-CSCF device 134-B and P-CSCF device 132-B (signals 1283, 1284, and 1285).

AS 140-A may act as a SIP user agent for MDN2 and may perform the authorization procedure for MDN2 to generate an authentication value for MDN2, based on, for example, a private key obtained from HSS 138-A in the UDA message, in response to receiving the authorization request (signal 1286). AS 140-A may re-send the register request for MDN2 with the generated authentication value to P-CSCF device 132-B (signal 1287). P-CSCF device 132-B may forward the register request to I-CSCF device 134-B (signal 1288). I-CSCF device 134-B may interrogate HSS 138-B for the location of S-CSCF device 136-B by sending a UAR for MDN2 to HSS 138-B (signal 1289). HSS 138-B may locate S-CSCF device 136-B (signal 1290) and may send a UAA for MDN2 back to I-CSCF device 134-B with the location of S-CSCF device 136-B (signal 1291).

I-CSCF device 134-B send the register request for MDN2 with the generated authentication value to S-CSCF device 136-B (signal 1292). S-CSCF device 136-B may authenticate the register request using the authentication value generated by HSS 138-B (signal 1293) and may send a SAR for MDN2 to HSS 138-B (signal 1294). HSS 138-B may determine, based on IRS record 501, associated with MDN2, that MDN1 and MDN2 are associated with UE 110 and may, in response to MDN2 being registered, update IRS record 501, and/or other records associated with the subscriber of UE 110, that both MDN1 and MDN2 are registered and active for UE 110, with MDN1 being foreign to IMS network 130-B (signal 1295). HSS 138-B may send an SAA for MDN2 back to S-CSCF device 136-B (signal 1296). The SAA may indicate that the service profile for UE 110 includes both MDN1 and MDN2. S-CSCF device 136-B may send a SIP 200 OK message back to AS 140-A via I-CSCF device 134-B and P-CSCF device 132-B (signals 1297, 1298, and 1299), indicating that MDN2 was successfully registered. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 12 may be performed with IMS networks 130-A and 130-B reversing roles and with MDN1 and MDN2 reversing roles.

Figure 13:
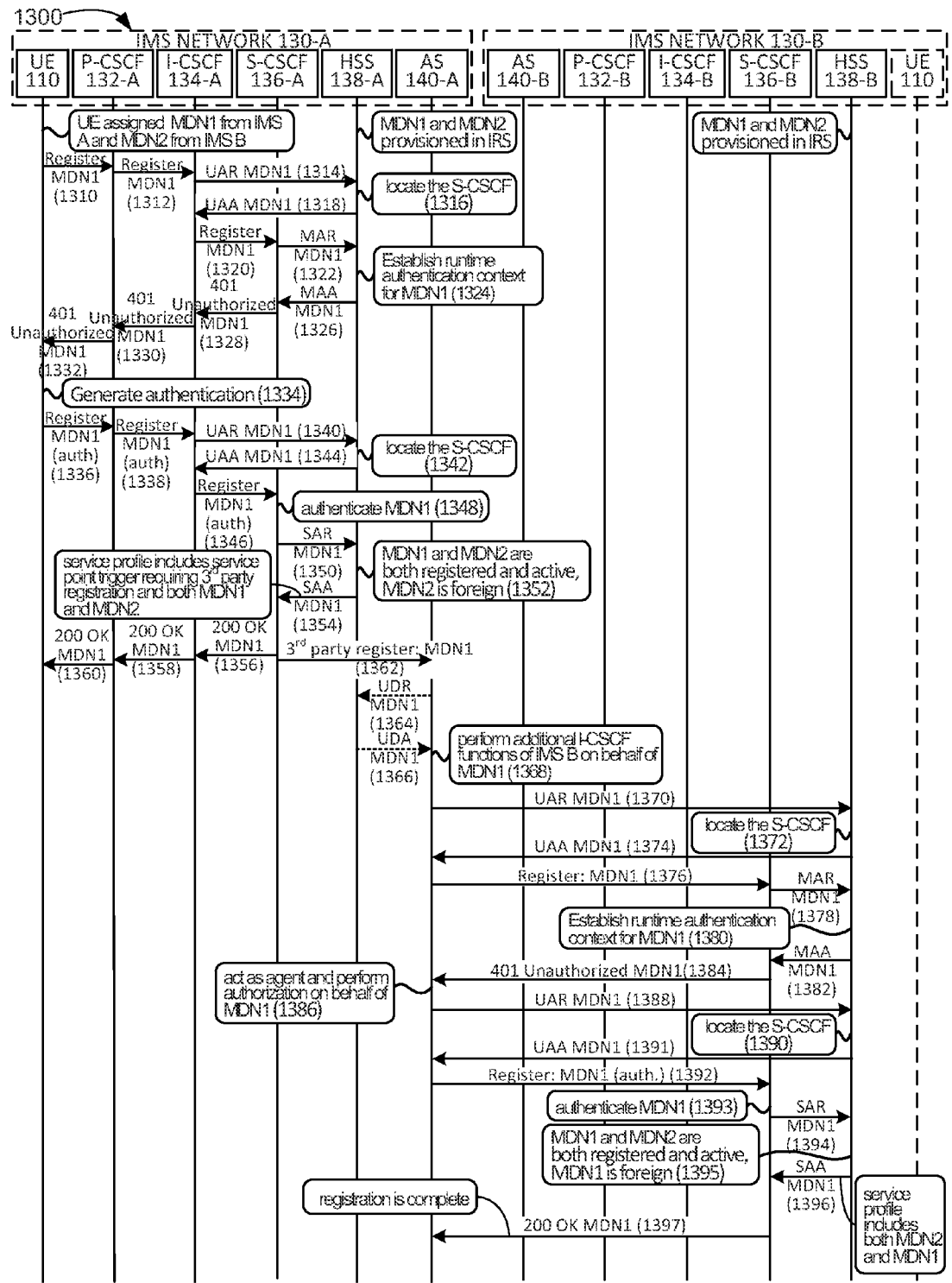
FIG. 13 is an exemplary signal flow diagram illustrating a third implementation of registering a mobile directory number with a second Internet Protocol Multimedia Subsystem network according to an implementation described herein.

FIG. 13 is an exemplary signal flow diagram 1300 illustrating a third implementation of registering a mobile directory number with a second Internet Protocol Multimedia Subsystem network according to an implementation described herein. As shown in FIG. 13, signal flow diagram 1300 includes interactions between IMS network 130-A and IMS network 130-B. In the implementation shown in FIG. 13, mobile directory numbers MDN1 and MDN2 are available in UE 110, IMS network 130-A is home to MDN1, IMS network 130-B is home to MDN2, registration is started in IMS network 130-A using the home MDN (MDN1), and registration with the second IMS network (IMS network 130-B) is performed with via the home AS (AS 140-A) and the foreign IMS network S-CSCF (S-CSCF device 136-B) using the home MDN for the first network (MDN1).

The signal flow may begin with UE 110 registering MDN1 with IMS network 130-A, using signal flows 1310-1360. Signal flows 1310-1360 may be analogous to signal flows 1110-1160 explained above with reference to FIG. 11. As explained above with respect to signal 1154, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

In response to detecting the service point trigger, S-CSCF device 136-A may determine that $3^{rd}$ party registration with a foreign IMS network using a foreign MDN is not allowed, and may send a $3^{rd}$ party register request to AS 140-A to register the home MDN (MDN1) with IMS network 130-B (signal 1362). AS 140-A may send a UDR to HSS 138-A (signal 1364) to obtain information associated with MDN1, such as the address of HSS 138-B. HSS 138-A may provide the information associated with MDN1 to AS 140-A in a UDA (signal 1366). AS 140-A may perform additional I-CSCF functions of IMS network 130-B on behalf of MDN1, such as interrogating HSS 138-B for the location of S-CSCF device 136-B (signal 1368).

AS 140-A may interrogate HSS 138-B for the location of S-CSCF device 136-B by sending a UAR for MDN1 to HSS 138-B (signal 1370). HSS 138-B may locate S-CSCF device 136-B (signal 1372) and may send a UAA back to AS 140-A with the location of S-CSCF device 136-B (signal 1374). AS 140-A may, in response to receiving information about the location of S-CSCF device 136-B, forward the register request for MDN1 to S-CSCF device 136-B (signal 1376). S-CSCF device 136-B may respond by sending an MAR for MDN1 to HSS 138-B (signal 1378). HSS 138-B may establish a run-time authentication context for MDN1, which may generate an authentication value, based on, for example, a stored private key, to be used to authenticate MDN1 (signal 1380) and may send a MAA for MDN1 back to S-CSCF device 136-B (signal 1382). The MAA may include the generated authentication value. S-CSCF device 136-B may send an unauthorized response, requesting an authentication value, back to AS 140-A (signal 1384).

AS 140-A may act as a SIP user agent for MDN1 and may perform the authorization procedure for MDN1 to generate an authentication value for MDN1, based on, for example, a private key obtained from HSS 138-A in the UDA message, in response to receiving the authorization request (signal 1386). AS 140-A may interrogate HSS 138-B for the location of S-CSCF device 136-B by sending a UAR for MDN1 to HSS 138-B (signal 1388). HSS 138-B may locate S-CSCF device 136-B (signal 1390) and may send a UAA for MDN1 back to AS 140-A with the location of S-CSCF device 136-B (signal 1391).

AS 140-A may re-send the register request for MDN1 with the generated authentication value to S-CSCF device 136-B (signal 1392). S-CSCF device 136-B may authenticate the register request using the authentication value generated by HSS 138-B (signal 1393) and may send a SAR for MDN1 to HSS 138-B (signal 1394). HSS 138-B may determine, based on IRS record 501, associated with MDN1, that MDN1 and MDN2 are associated with UE 110 and may, in response to MDN1 being registered, update IRS record 501, and/or other records associated with the subscriber of UE 110, that both MDN1 and MDN2 are registered and active for UE 110, with MDN1 being foreign to IMS network 130-B (signal 1395). HSS 138-B may send an SAA for MDN1 back to S-CSCF device 136-B (signal 1396). The SAA may indicate that the service profile for UE 110 includes both MDN1 and MDN2. S-CSCF device 136-B may send a SIP 200 OK message back to AS 140-A (signal 1397), indicating that MDN1 was successfully registered. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 13 may be performed with IMS networks 130-A and 130-B reversing roles and with MDN1 and MDN2 reversing roles.

Figure 14:
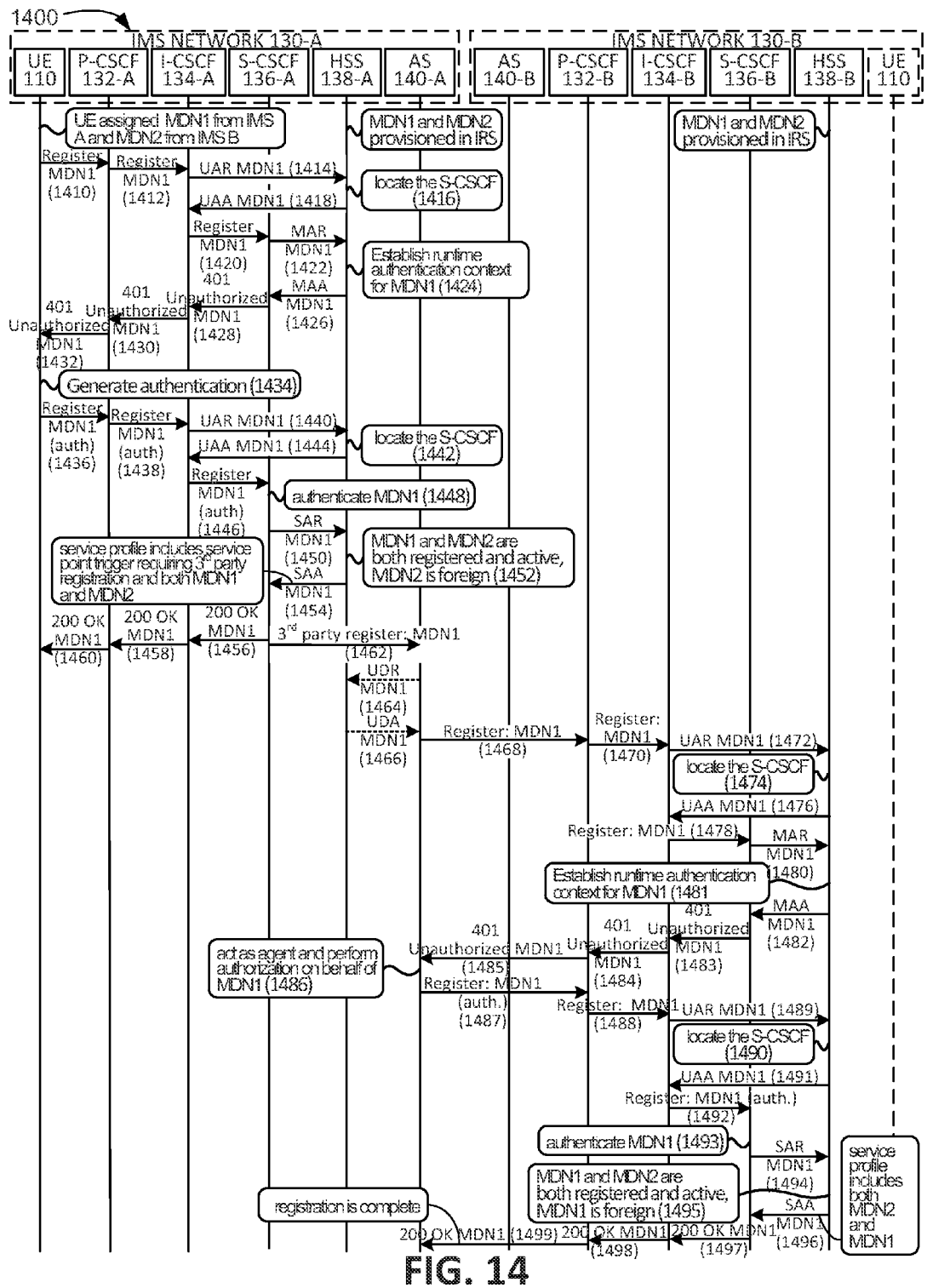
FIG. 14 is an exemplary signal flow diagram illustrating a fourth implementation of registering a mobile directory number with a second Internet Protocol Multimedia Subsystem network according to an implementation described herein.

FIG. 14 is an exemplary signal flow diagram 1400 illustrating a fourth implementation of registering a mobile directory number with a second Internet Protocol Multimedia Subsystem network according to an implementation described herein. As shown in FIG. 14, signal flow diagram 1400 includes interactions between IMS network 130-A and IMS network 130-B. In the implementation shown in FIG. 14, mobile directory numbers MDN1 and MDN2 are available in UE 110, IMS network 130-A is home to MDN1, IMS network 130-B is home to MDN2, registration is started in IMS network 130-A using the home MDN (MDN1), and registration with the second IMS network (IMS network 130-B) is performed with via the home AS (AS 140-A) and the foreign IMS network P-CSCF (P-CSCF device 132-B) using the home MDN for the first network (MDN1).

The signal flow may begin with UE 110 registering MDN1 with IMS network 130-A, using signal flows 1410-1460. Signal flows 1410-1460 may be analogous to signal flows 1110-1160 explained above with reference to FIG. 11. As explained above with respect to signal 1154, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

In response to detecting the service point trigger, S-CSCF device 136-A may determine that $3^{rd}$ party registration with a foreign IMS network using a foreign MDN is not allowed, and may send a $3^{rd}$ party register request to AS 140-A to register the home MDN (MDN1) with IMS network 130-B (signal 1462). AS 140-A may send a UDR to HSS 138-A (signal 1464) to obtain information associated with MDN1, such as the address of P-CSCF device 132-B. HSS 138-A may provide the information associated with MDN1 to AS 140-A in a UDA (signal 1466).

In response to receiving UDA, AS 140-A may send a register request for MDN1 to P-CSCF device 132-B (signal 1468). P-CSCF device 132-B may forward the register request to I-CSCF device 134-B (signal 1470). I-CSCF device 134-B may interrogate HSS 138-B for the location of S-CSCF device 136-B by sending a UAR for MDN1 to HSS 138-B (signal 1472). HSS 138-B may locate S-CSCF device 136-B (signal 1474) and may send a UAA back to I-CSCF device 134-B with the location of S-CSCF device 136-B (signal 1476). I-CSCF device 134-B may, in response to receiving information about the location of S-CSCF device 136-B, forward the register request for MDN1 to S-CSCF device 136-B (signal 1478). S-CSCF device 136-B may respond by sending an MAR for MDN1 to HSS 138-B (signal 1480). HSS 138-B may establish a run-time authentication context for MDN1, which may generate an authentication value, based on, for example, a stored private key, to be used to authenticate MDN1 (signal 1481) and may send a MAA for MDN1 back to S-CSCF device 136-B (signal 1482). The MAA may include the generated authentication value. S-CSCF device 136-B may send an unauthorized response, requesting an authentication value, back to AS 140-A via I-CSCF device 134-B and P-CSCF device 132-B (signals 1483, 1484, and 1485).

AS 140-A may act as a SIP user agent for MDN1 and may perform the authorization procedure for MDN1 to generate an authentication value for MDN1, based on, for example, a private key obtained from HSS 138-A in the UDA message, in response to receiving the authorization request (signal 1486). AS 140-A may re-send the register request for MDN1 with the generated authentication value to P-CSCF device 132-B (signal 1487). P-CSCF device 132-B may forward the register request to I-CSCF device 134-B (signal 1488). I-CSCF device 134-B may interrogate HSS 138-B for the location of S-CSCF device 136-B by sending a UAR for MDN1 to HSS 138-B (signal 1489). HSS 138-B may locate S-CSCF device 136-B (signal 1490) and may send a UAA for MDN1 back to I-CSCF device 134-B with the location of S-CSCF device 136-B (signal 1491).

I-CSCF device 134-B send the register request for MDN1 with the generated authentication value to S-CSCF device 136-B (signal 1492). S-CSCF device 136-B may authenticate the register request using the authentication value generated by HSS 138-B (signal 1493) and may send a SAR for MDN1 to HSS 138-B (signal 1494). HSS 138-B may determine, based on IRS record 501, associated with MDN1, that MDN1 and MDN2 are associated with UE 110 and may, in response to MDN1 being registered, update IRS record 501, and/or other records associated with the subscriber of UE 110, that both MDN1 and MDN2 are registered and active for UE 110, with MDN1 being foreign to IMS network 130-B (signal 1495). HSS 138-B may send an SAA for MDN1 back to S-CSCF device 136-B (signal 1496). The SAA may indicate that the service profile for UE 110 includes both MDN1 and MDN2. S-CSCF device 136-B may send a SIP 200 OK message back to AS 140-A via I-CSCF device 134-B and P-CSCF device 132-B (signals 1497, 1498, and 1499), indicating that MDN1 was successfully registered. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 14 may be performed with IMS networks 130-A and 130-B reversing roles and with MDN1 and MDN2 reversing roles.

Figure 15:
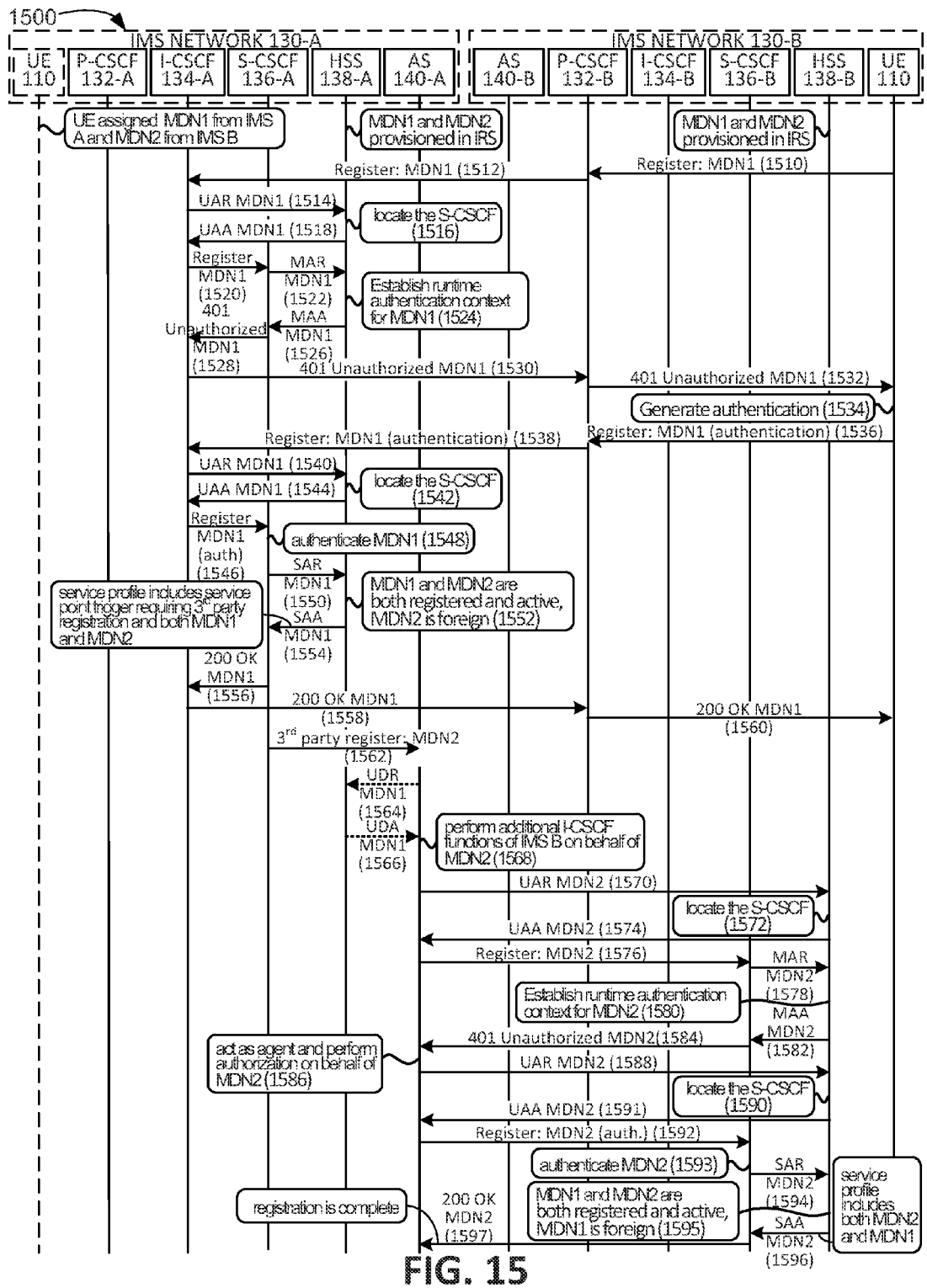
FIG. 15 is an exemplary signal flow diagram illustrating a fifth implementation of registering a mobile directory number with a second Internet Protocol Multimedia Subsystem network according to an implementation described herein.

FIG. 15 is an exemplary signal flow diagram 1500 illustrating a fifth implementation of registering a mobile directory number with a second Internet Protocol Multimedia Subsystem network according to an implementation described herein. As shown in FIG. 15, signal flow diagram 1500 includes interactions between IMS network 130-A and IMS network 130-B. In the implementation shown in FIG. 15, only mobile directory number MDN1 is available in UE 110, IMS network 130-A is home to MDN1, IMS network 130-B is home to MDN2, registration is started in IMS network 130-B using the available MDN foreign to IMS network 130-B (MDN1), registration in IMS network 130-A is performed using the available MDN (MDN1), and registration with the second IMS network (IMS network 130-B) is performed with via the home AS (AS 140-A) and the foreign IMS network S-CSCF (S-CSCF device 136-B) using the foreign MDN for the first network (MDN2).

The signal flow may begin with UE 110 powering up in the coverage area of IMS network 130-B and sending a register request (e.g. a SIP REGISTER message) to P-CSCF device 132-B for MDN1 via access network 120-B (signal 1510). P-CSCF device 132-B may determine that IMS network 130-A is the home network for MDN1 and may forward the register request to I-CSCF device 134-A of IMS network 130-A (signal 1512). I-CSCF device 134-A may interrogate HSS 138-A for the location of S-CSCF device 136-A by sending a UAR for MDN1 to HSS 138-A (signal 1514). HSS 138-A may locate S-CSCF device 136-A (signal 1516) and may send a UAA for MDN1 back to I-CSCF device 134-A with the location of S-CSCF device 136-A (signal 1518).

I-CSCF device 134-A may, in response to receiving information about the location of S-CSCF device 136-A, forward the registration request for MDN1 to S-CSCF device 136-A (signal 1520). S-CSCF device 136-A may respond by sending an MAR for MDN1 to HSS 138-A (signal 1522). HSS 138-A may establish a run-time authentication context for MDN1, which may generate an authentication value, based on, for example, a stored private key, to be used to authenticate MDN1 (signal 1524) and may send an MAA for MDN1 back to S-CSCF device 136-A (signal 1526). The MAA may include the generated authentication value. S-CSCF device 136-A may send an unauthorized response, requesting an authentication value for MDN1, back to UE 110, via I-CSCF device 134-A and P-CSCF device 132-B (signals 1528, 1530, and 1532).

UE 110 may generate an authentication value for MDN1, based on, for example, a stored private key, in response to receiving the authorization request (signal 1534) and may re-send the register request for MDN1 to P-CSCF device 132-B (signal 1536) and P-CSCF device 132-B may forward the register request to I-CSCF device 134-A (signal 1538). I-CSCF device 134-A may interrogate HSS 138-A for the location of S-CSCF device 136-A by sending a UAR for MDN1 to HSS 138-A (signal 1540). HSS 138-A may locate S-CSCF device 136-A (signal 1542) and may send a UAA for MDN1 back to I-CSCF device 134-A with the location of S-CSCF device 136-A (signal 1544).

I-CSCF device 134-A may, in response to receiving information about the location of S-CSCF device 136-A, forward the register request for MDN1, with the authentication value, to S-CSCF device 136-A (signal 1546). S-CSCF device 136-A may authenticate the register request using the authentication value generated by HSS 138-A (signal 1548) and may send a SAR for MDN1 to HSS 138-A (signal 1550). HSS 138-A may determine, based on IRS record 501, associated with MDN1, that MDN1 and MDN2 are associated with UE 110 and may, in response to MDN1 being activated, update IRS record 501, and/or other records associated with the subscriber of UE 110, that both MDN1 and MDN2 are registered and active for UE 110, with MDN2 being foreign (signal 1552).

HSS 138-A may send an SAA for MDN1 back to S-CSCF device 136-A (signal 1554). S-CSCF device 136-A may send a SIP 200 OK message for MDN1 back to UE 110 via I-CSCF device 134-A and P-CSCF device 132-B (signals 1556, 1558, and 1560), indicating that MDN1 was successfully registered. Furthermore, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

Signal flows 1562-1597 may be analogous to signal flows 1162-1197 explained above with reference to FIG. 11. As explained above with respect to signals 1162-1197, AS 140-A may register MDN2 with IMS network 130-B via S-CSCF device 134-B. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 15 may be performed with IMS networks 130-A and 130-B reversing roles and with MDN1 and MDN2 reversing roles.

Figure 16:
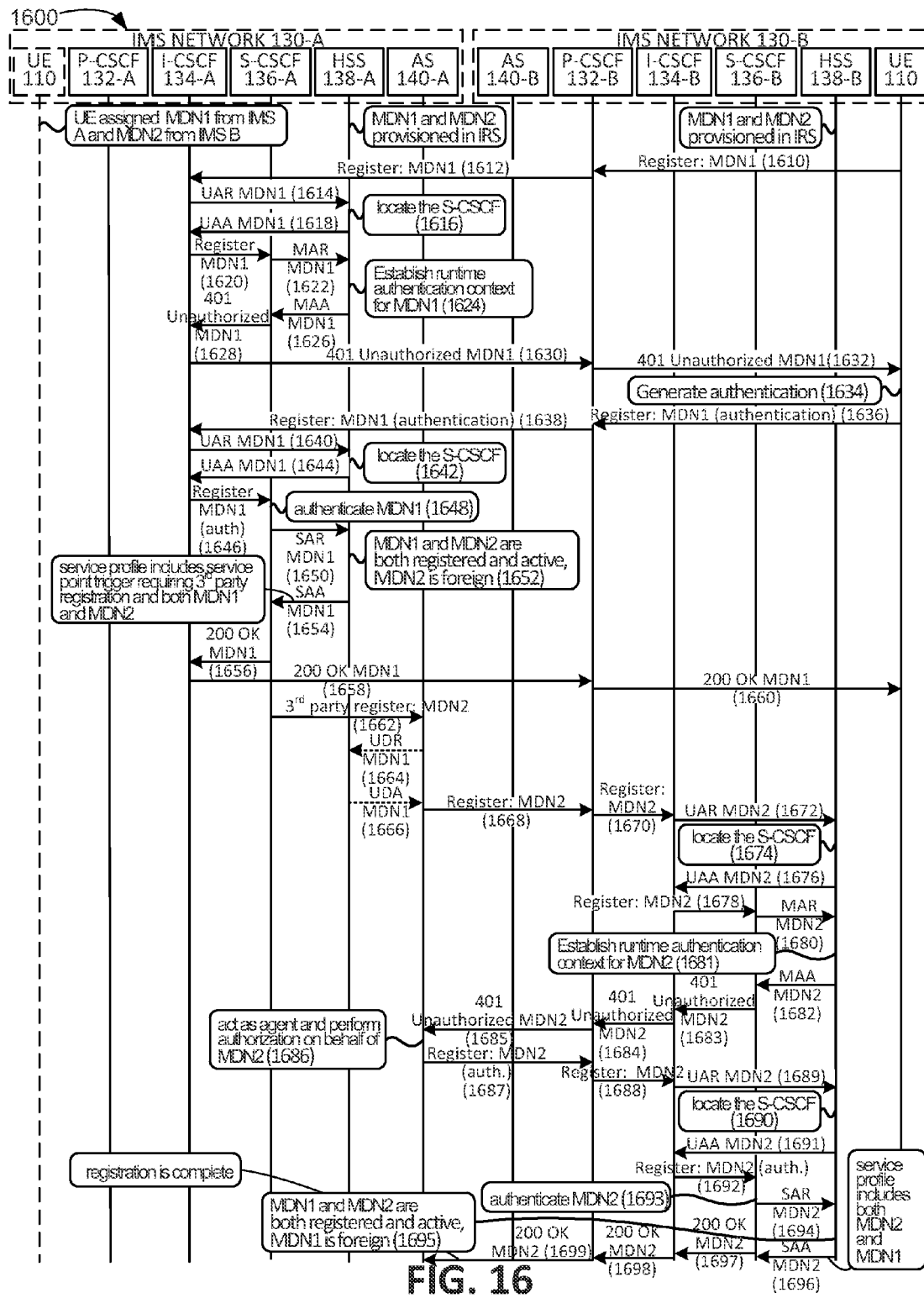
FIG. 16 is an exemplary signal flow diagram illustrating a sixth implementation of registering a mobile directory number with a second Internet Protocol Multimedia Subsystem network according to an implementation described herein.

FIG. 16 is an exemplary signal flow diagram 1600 illustrating a sixth implementation of registering a mobile directory number with a second Internet Protocol Multimedia Subsystem network according to an implementation described herein. As shown in FIG. 16, signal flow diagram 1600 includes interactions between IMS network 130-A and IMS network 130-B. In the implementation shown in FIG. 16, only mobile directory number MDN1 is available in UE 110, IMS network 130-A is home to MDN1, IMS network 130-B is home to MDN2, registration is started in IMS network 130-B using the available MDN foreign to IMS network 130-B (MDN1), registration in IMS network 130-A is performed using the available MDN (MDN1), and registration with the second IMS network (IMS network 130-B) is performed with via the home AS (AS 140-A) and the foreign IMS network P-CSCF (P-CSCF device 132-B) using the foreign MDN for the first network (MDN2).

The signal flow may begin with UE 110 registering MDN1 with IMS network 130-A, using signal flows 1610-1660. Signal flows 1610-1660 may be analogous to signal flows 1510-1560 explained above with reference to FIG. 15. As explained above with respect to signal 1554, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

Signal flows 1662-1699 may be analogous to signal flows 1262-1299 explained above with reference to FIG. 12. As explained above with respect to signals 1262-1299, AS 140-A may register MDN2 with IMS network 130-B via P-CSCF device 132-B. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 16 may be performed with IMS networks 130-A and 130-B reversing roles and with MDN1 and MDN2 reversing roles.

Figure 17:
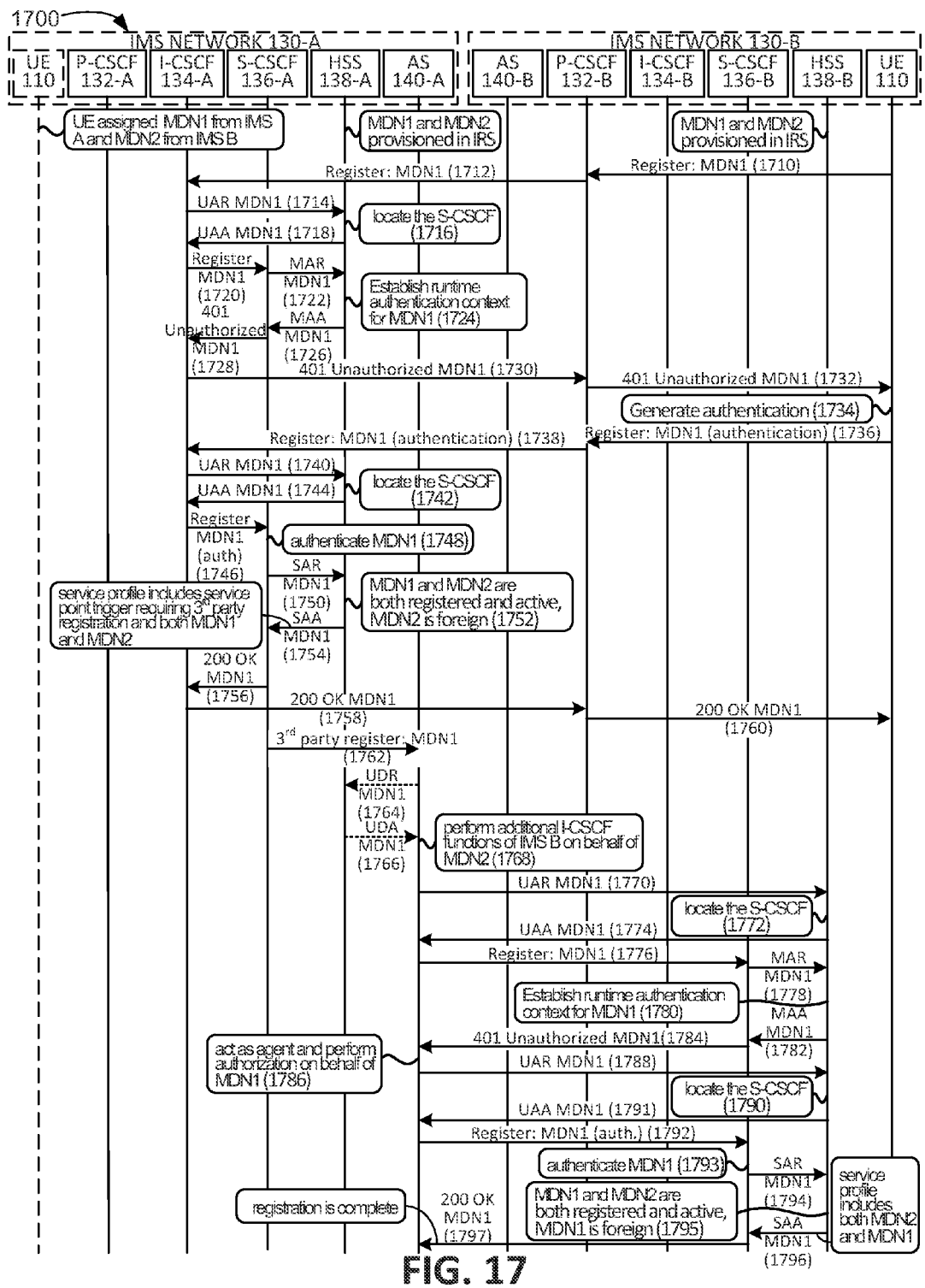
FIG. 17 is an exemplary signal flow diagram illustrating a seventh implementation of registering a mobile directory number with a second Internet Protocol Multimedia Subsystem network according to an implementation described herein.

FIG. 17 is an exemplary signal flow diagram 1700 illustrating a seventh implementation of registering a mobile directory number with a second Internet Protocol Multimedia Subsystem network according to an implementation described herein. As shown in FIG. 17, signal flow diagram 1700 includes interactions between IMS network 130-A and IMS network 130-B. In the implementation shown in FIG. 17, only mobile directory number MDN1 is available in UE 110, IMS network 130-A is home to MDN1, IMS network 130-B is home to MDN2, registration is started in IMS network 130-B using the available MDN foreign to IMS network 130-B (MDN1), registration in IMS network 130-A is performed using the available MDN (MDN1), and registration with the second IMS network (IMS network 130-B) is performed with via the home AS (AS 140-A) and the foreign IMS network S-CSCF (S-CSCF device 136-B) using the home MDN for the first network (MDN1).

The signal flow may begin with UE 110 registering MDN1 with IMS network 130-A, using signal flows 1710-1760. Signal flows 1710-1760 may be analogous to signal flows 1510-1560 explained above with reference to FIG. 15. As explained above with respect to signal 1554, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

Signal flows 1762-1797 may be analogous to signal flows 1362-1397 explained above with reference to FIG. 13. As explained above with respect to signals 1362-1397, AS 140-A may register MDN1 with IMS network 130-B via S-CSCF device 136-B. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 17 may be performed with IMS networks 130-A and 130-B reversing roles and with MDN1 and MDN2 reversing roles.

Figure 18:
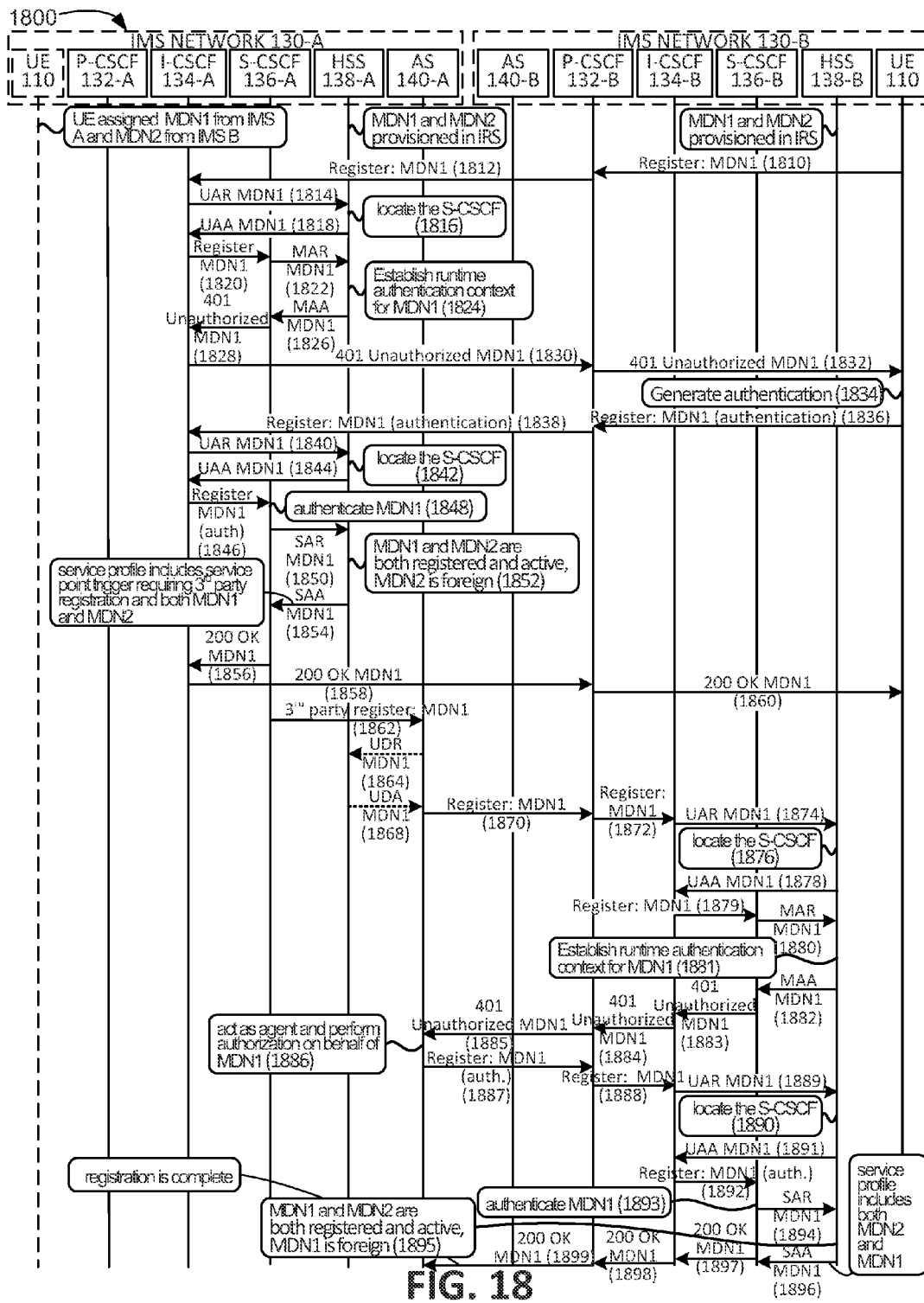
FIG. 18 is an exemplary signal flow diagram illustrating an eighth implementation of registering a mobile directory number with a second Internet Protocol Multimedia Subsystem network according to an implementation described herein.

FIG. 18 is an exemplary signal flow diagram 1800 illustrating an eighth implementation of registering a mobile directory number with a second Internet Protocol Multimedia Subsystem network according to an implementation described herein. As shown in FIG. 18, signal flow diagram 1800 includes interactions between IMS network 130-A and IMS network 130-B. In the implementation shown in FIG. 18, only mobile directory number MDN1 is available in UE 110, IMS network 130-A is home to MDN1, IMS network 130-B is home to MDN2, registration is started in IMS network 130-B using the available MDN foreign to IMS network 130-B (MDN1), registration in IMS network 130-A is performed using the available MDN (MDN1), and registration with the second IMS network (IMS network 130-B) is performed with via the home AS (AS 140-A) and the foreign IMS network P-CSCF (P-CSCF device 132-B) using the home MDN for the first network (MDN1).

The signal flow may begin with UE 110 registering MDN1 with IMS network 130-A, using signal flows 1810-1860. Signal flows 1810-1860 may be analogous to signal flows 1510-1560 explained above with reference to FIG. 15. As explained above with respect to signal 1554, HSS 138-A may determine that service profile field 530 of IRS record 501 includes a service point trigger requiring $3^{rd}$ party registration of both MDN1 and MDN2 and may include the service point trigger in the SAA sent to S-CSCF device 136-A.

Signal flows 1862-1899 may be analogous to signal flows 1362-1399 explained above with reference to FIG. 13. As explained above with respect to signals 1362-1399, AS 140-A may register MDN1 with IMS network 130-B via P-CSCF device 132-B. Registration of MDN1 and MDN2 may now be complete and UE 110 may send and/or receive calls using MDN1 through IMS network 130-A and using MDN2 through IMS network 130-B.

If UE 110 moves from the coverage area of IMS network 130-A to the coverage area of IMS network 130-B, the signal flow of FIG. 18 may be performed with IMS networks 130-A and 130-B reversing roles and with MDN1 and MDN2 reversing roles.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-10, the order of the blocks may be modified in other implementations. Further, non-dependent blocks may be performed in parallel. As another example, while series of signal flows have been described with respect to FIGS. 11-18, the order of the signal flows may be modified in other implementations. Further, non-dependent signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
    a first Internet Protocol Multimedia Subsystem network comprising one or more devices configured to:
        receive a first registration request for a first mobile directory number, associated with a subscriber, wherein the first mobile directory number corresponds to a home mobile directory number with respect to the first Internet Protocol Multimedia Subsystem network;
        register the first mobile directory number with the first Internet Protocol Multimedia Subsystem network;
        detect a service point trigger to register a second mobile directory number, foreign to the first Internet Protocol Multimedia Subsystem network, with a second Internet Protocol Multimedia Subsystem network, in response to the first mobile directory number being registered, wherein the service point trigger is stored in a service profile, associated with the subscriber, in a Home Subscriber Server; and
        send a second registration request to the second Internet Protocol Multimedia Subsystem network, to register the second mobile directory number with the second Internet Protocol Multimedia Subsystem network.

2. The system of claim 1, wherein the first registration request is received from a user equipment device associated with the subscriber.

3. The system of claim 1, wherein the first registration request is received from the second Internet Protocol Multimedia Subsystem network on behalf of a user equipment device associated with the subscriber.

4. The system of claim 1, wherein the one or more devices are further configured to:
    function as an Interrogating Call Cession Control Function device for the second mobile directory number with respect to the second Internet Protocol Multimedia Subsystem network.

5. The system of claim 1, wherein the one or more devices are further configured to:
    determine that registration with the second Internet Protocol Multimedia Subsystem network using a foreign mobile directory number is allowed in the first Internet Protocol Multimedia Subsystem network; and
    send the second registration request to the second Internet Protocol Multimedia Subsystem network, to register the second mobile directory number with the second Internet Protocol Multimedia Subsystem network using the second mobile directory number.

6. The system of claim 1, wherein the one or more devices are further configured to:
    determine that registration with the second Internet Protocol Multimedia Subsystem network using a foreign mobile directory number is not allowed in the first Internet Protocol Multimedia Subsystem network; and
    send the second registration request to the second Internet Protocol Multimedia Subsystem network, to register the second mobile directory number with the second Internet Protocol Multimedia Subsystem network using the first mobile directory number.

7. The system of claim 1, wherein the one or more devices are further configured to:
    send the second registration request to the second Internet Protocol Multimedia Subsystem network, to register the second mobile directory number with the second Internet Protocol Multimedia Subsystem network, to a Serving Call Session Control Function device of the second Internet Protocol Multimedia Subsystem network.

8. The system of claim 1, wherein the one or more devices are further configured to:
    send the second registration request to the second Internet Protocol Multimedia Subsystem network, to register the second mobile directory number with the second Internet Protocol Multimedia Subsystem network, to a Proxy Call Session Control Function device of the second Internet Protocol Multimedia Subsystem network.

9. A method, performed by one or more devices of a first Internet Protocol Multimedia Subsystem network, the method comprising:
    receiving, by at least one of the one or more devices, a first registration request for a first mobile directory number, associated with a subscriber, wherein the first mobile directory number corresponds to a home mobile directory number with respect to the first Internet Protocol Multimedia Subsystem network;
    registering, by at least one of the one or more devices, the first mobile directory number with the first Internet Protocol Multimedia Subsystem network;
    detecting, by at least one of the one or more devices, a service point trigger to register a second mobile directory number, foreign to the first Internet Protocol Multimedia Subsystem network, with a second Internet Protocol Multimedia Subsystem network, in response to the first mobile directory number being registered, wherein the service point trigger is stored in a service profile, associated with the subscriber, in a Home Subscriber Server; and
    sending, by at least one of the one or more devices, a second registration request to the second Internet Protocol Multimedia Subsystem network, to register the second mobile directory number with the second Internet Protocol Multimedia Subsystem network.

10. The method of claim 9, wherein the first registration request is received from a user equipment device associated with the subscriber.

11. The method of claim 9, wherein the first registration request is received from the second Internet Protocol Multimedia Subsystem network on behalf of a user equipment device associated with the subscriber.

12. The method of claim 9, further comprising:
    performing one or more functions of an Interrogating Call Cession Control Function device for the second mobile directory number with respect to the second Internet Protocol Multimedia Subsystem network.

13. The method of claim 9, further comprising:
    determining that registration with the second Internet Protocol Multimedia Subsystem network using a foreign mobile directory number is allowed in the first Internet Protocol Multimedia Subsystem network; and
    sending the second registration request to the second Internet Protocol Multimedia Subsystem network, to register the second mobile directory number with the second Internet Protocol Multimedia Subsystem network using the second mobile directory number.

14. The method of claim 9, further comprising:
    determining that registration with the second Internet Protocol Multimedia Subsystem network using a foreign mobile directory number is not allowed in the first Internet Protocol Multimedia Subsystem network; and
    sending the second registration request to the second Internet Protocol Multimedia Subsystem network, to register the second mobile directory number with the second Internet Protocol Multimedia Subsystem network using the first mobile directory number.

15. The method of claim 9, further comprising:
sending the second registration request to the second Internet Protocol Multimedia Subsystem network, to register the second mobile directory number with the second Internet Protocol Multimedia Subsystem network, to a Serving Call Session Control Function device of the second Internet Protocol Multimedia Subsystem network.

16. The method of claim 9, further comprising:
sending the second registration request to the second Internet Protocol Multimedia Subsystem network, to register the second mobile directory number with the second Internet Protocol Multimedia Subsystem network, to a Proxy Call Session Control Function device of the second Internet Protocol Multimedia Subsystem network.

17. A system comprising:
an application server device, associated with a first Internet Protocol Multimedia Subsystem network, configured to:
  receive a first registration request for a mobile directory number associated with a user equipment device;
  identify a second Internet Protocol Multimedia Subsystem network, associated with the mobile directory number;
  receive an indication from a Home Subscriber Server to register the mobile directory number with the second Internet Protocol Multimedia subsystem network based on a service point trigger, associated with the user equipment device, stored in the Home Subscriber Server;
  send a second registration request for the mobile directory number to a Call Session Control Function device associated with the second Internet Protocol Multimedia Subsystem network based on the received indication;
  receive an authentication request from the Call Session Control Function device, in response to the sent second registration request;
  obtain an authentication value for the mobile directory number, in response to receiving the authentication request;
  send a third registration request for the mobile director number to the Call Session Control Function device with the obtained authentication value; and
  receive an indication from the Call Session Control Function device that a registration of the mobile directory number with the second Internet Protocol Multimedia Subsystem network has been successfully completed.

18. The system of claim 17, wherein the user equipment device is associated with a first mobile directory number and a second mobile directory number, wherein the first Internet Protocol Multimedia Subsystem network is home to the first mobile directory number, wherein the second Internet Protocol Multimedia Subsystem network is home to the second mobile directory number, and wherein the mobile directory number corresponds to the first mobile directory number.

19. The system of claim 17, wherein the user equipment device is associated with a first mobile directory number and a second mobile directory number, wherein the first Internet Protocol Multimedia Subsystem network is home to the first mobile directory number, wherein the second Internet Protocol Multimedia Subsystem network is home to the second mobile directory number, and wherein the mobile directory number corresponds to the second mobile directory number.

20. The system of claim 17, wherein the application server device is configured to send the second registration request for the mobile directory number to a Proxy Call Session Control Function device associated with the second Internet Protocol Multimedia Subsystem network.

21. The system of claim 17, wherein the application server device is configured to send the second registration request for the mobile directory number to a Serving Call Session Control Function device associated with the second Internet Protocol Multimedia Subsystem network.

22. The system of claim 17, wherein the system further includes the Home Subscriber Server, and wherein the Home Subscriber Server is configured to:
  store an implicit registration set for the user equipment device, wherein the implicit registration set includes the service point trigger to register the mobile directory number with the second Internet Protocol Multimedia Subsystem in response to another mobile directory number, associated with the user equipment device, being registered;
  receive an indication that the other mobile directory number, associated with the user equipment device, has been registered; and
  send the indication to register the mobile directory number with the second Internet Protocol Multimedia Subsystem, in response to receiving the indication that the other mobile directory number, associated with the user equipment device, has been registered.

23. The system of claim 22, further comprising:
a Serving Call Session Control Function device, associated with the first Internet Protocol Multimedia Subsystem network, configured to:
receive, from the Home Subscriber server, the indication to register the mobile directory number with the second Internet Protocol Multimedia Subsystem; and
send the first registration request to the application server device, in response to receiving the indication from the Home Subscriber Server.

* * * * *